(12) United States Patent
Morikawa

(10) Patent No.: US 7,979,515 B2
(45) Date of Patent: Jul. 12, 2011

(54) DISTRIBUTION MANAGEMENT METHOD, A DISTRIBUTION MANAGEMENT SYSTEM AND A DISTRIBUTION MANAGEMENT SERVER

(75) Inventor: Itaru Morikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 12/330,854

(22) Filed: Dec. 9, 2008

(65) Prior Publication Data
US 2009/0259734 A1 Oct. 15, 2009

(30) Foreign Application Priority Data

Apr. 10, 2008 (JP) .................................. 2008-102396
Oct. 10, 2008 (JP) .................................. 2008-264285

(51) Int. Cl.
*G06F 15/177* (2006.01)
(52) U.S. Cl. ...................... 709/220; 717/172; 717/177
(58) Field of Classification Search .................... None
See application file for complete search history.

(56) References Cited

U.S. PATENT DOCUMENTS

| 6,510,513 B1 * | 1/2003 | Danieli ............... 713/156 |
| 2002/0062332 A1 * | 5/2002 | Nogami et al. ............... 709/103 |

FOREIGN PATENT DOCUMENTS

| JP | 09-146858 | 6/1997 |
| JP | 2006-309416 | 11/2006 |

OTHER PUBLICATIONS

Michiaki et al., English Translation of JP2006-309416, Nov. 9, 2006.*
Naoto et al., English Translation of JP09-146858, Jun. 6, 1997.*

* cited by examiner

*Primary Examiner* — Ario Etienne
*Assistant Examiner* — Clayton R Williams
(74) *Attorney, Agent, or Firm* — Brundidge & Stanger, P.C.

(57) ABSTRACT

A distribution management system is provided which can have a high software distribution efficiency by using client terminals substituting for software distribution relay and can reliably collect distribution results without depending upon the statuses of client terminals. A distribution management server groups a plurality of representative clients in charge of software distribution relay, and changes assignment of software distribution target client terminals by monitoring the distribution execution status of each representative client terminal. Further, the client terminal can reliably notify the distribution result to the distribution management server in accordance with a list of grouped representative client terminals. Furthermore, for the client terminal not notifying the distribution result even if the notice term expires, a distribution result notice representative client terminal is set further so that the distribution result can be reliably notified to the distribution management server.

4 Claims, 27 Drawing Sheets

FIG. 2

200 INVENTORY TABLE

| HOST NAME | IP ADDRESS | CPU CLOCK NUMBER | MEMORY CAPACITY | EMPTY HDD CAPACITY | CPU USE FACTOR | MEMORY USE FACTOR |
|---|---|---|---|---|---|---|
| CLIENT A | 192.168.0.2 | 500MHz | 1024MB | 60GB | 5% | 10% |
| CLIENT B | 192.168.0.3 | 1.0GHz | 1024MB | 45GB | 50% | 20% |
| CLIENT C | 192.168.0.4 | 1.0GHz | 512MB | 50GB | 10% | 10% |

300 JOB EXECUTION HISTORY TABLE

| FILE SIZE | TARGET CLIENT NUMBER | HOST NAME | AVERAGE DISTRIBUTION TIME (PER CLIENT) |
|---|---|---|---|
| NOT LARGER THAN 100 M | NOT SMALLER THAN 100 CLIENTS | CLIENT A | OO MIN OO SEC |
| | | CLIENT B | OO MIN OO SEC |
| | | CLIENT C | OO MIN OO SEC |
| | ⋮ | ⋮ | ⋮ |
| | NOT SMALLER THAN 500 CLIENTS | CLIENT A | OO MIN OO SEC |
| ⋮ | ⋮ | ⋮ | ⋮ |
| 100~200M | NOT SMALLER THAN 100 CLIENTS | CLIENT A | OO MIN OO SEC |
| | | CLIENT B | OO MIN OO SEC |
| | ⋮ | ⋮ | ⋮ |

701 REPRESENTATIVE CLIENT GROUP LIST

| JOB ID: 101 GROUP ID: 1000 | | |
|---|---|---|
| ID | HOST NAME | IP ADDRESS |
| 1 | CLIENT A | 192.168.0.2 |
| 2 | CLIENT C | 192.168.0.4 |
| 3 | CLIENT F | 192.168.0.7 |

FIG. 8

801 DISTRIBUTION TARGET CLIENT LIST

| JOB ID: 101 | | | | |
|---|---|---|---|---|
| ID | HOST NAME | IP ADDRESS | DISTRIBUTION PRIORITY REPRESENTATIVE | DISTRIBUTION STATUS |
| 1 | CLIENT B | 192.168.0.3 | CLIENT A | |
| 2 | CLIENT D | 192.168.0.5 | CLIENT A | |
| 3 | CLIENT E | 192.168.0.6 | CLIENT F | |
| 4 | CLIENT G | 192.168.0.8 | CLIENT F | |
| 5 | CLIENT I | 192.168.0.10 | CLIENT C | |

FIG. 9

900 EXECUTION JOB TABLE

| JOB ID 901 | GROUP ID 902 | REPRESENTATIVE CLIENT 903 | DISTRIBUTION TARGET CLIENT 904 | JOB RESULT NOTICE TERM 905 | JOB COMPLETION TIME 906 |
|---|---|---|---|---|---|
| 101 | 1000 | CLIENT A, CLIENT C, CLIENT F | CLIENT B, CLIENT D, CLIENT E, CLIENT G | 08/01/01 17:00 | 08/01/01 13:00 |
| 102 | 1001 | ... | ... | 08/01/02 09:00 | |
| 103 | 1002 | ... | ... | 08/01/03 17:00 | |

PROCESSES OF JOB RELAY PROGRAM 118

FIG. 13

121 EXECUTED JOB LIST

| JOB ID |
|--------|
| 102 |
| 105 |
| 113 |

FIG. 14

122 REPRESENTATIVE GROUP LIST

| JOB ID | GROUP ID | REPRESENTATIVE CLIENT | CONNECTION STATUS |
|--------|----------|-----------------------|-------------------|
| 101 | 1000 | CLIENT A | |
| | | CLIENT C | |
| | | CLIENT F | |
| 105 | 1005 | ... | IMPOSSIBLE |
| 113 | 1013 | ... | |

FIG. 15

123 UNNOTIFIED RESULT LIST

| JOB ID | RESULT |
|--------|--------|
| 104 | NORMAL TERMINATION |
| 111 | FAILURE |
| 120 | NORMAL TERMINATION |

FIG. 17

1700 JOB EXECUTION RESULT TABLE

| JOB ID | HOST NAME | STATUS | DISTRIBUTION REPRESENTATIVE | RESULT NOTICE TIME |
|---|---|---|---|---|
| 101 | CLIENT B | NORMAL TERMINATION | CLIENT A | 08/01/01 12:00 |
| | CLIENT D | NORMAL TERMINATION | CLIENT A | 08/01/01 8:00 |
| | CLIENT E | FAILURE | CLIENT F | 07/12/30 10:00 |
| | CLIENT G | ALREADY DISTRIBUTED | CLIENT F | |
| 102 | CLIENT A | NORMAL TERMINATION | CLIENT D | 08/01/01 22:00 |
| | CLIENT B | FAILURE | CLIENT F | 08/01/02 3:00 |

FIG. 22

210 SOFTWARE INVENTORY TABLE

| ID | HOST NAME | PATCH/ANTIVIRUS PRODUCT NAME | VERSION |
|---|---|---|---|
| 1 | REFERENCE MACHINE | SECURITY UPDATE | KB920214 |
| 2 | REFERENCE MACHINE | HOT FIX | KB885835 |
| 3 | REFERENCE MACHINE | ANTIVIRUS SOFTWARE | Ver10,74.40.1,200X/04/24 rev25 |
| 4 | CLIENT A | SECURITY UPDATE | KB920214 |
| 5 | CLIENT A | HOT FIX | KB885835 |
| 6 | CLIENT A | ANTIVIRUS SOFTWARE | Ver10,74.40.1,200X/04/24 rev25 |
| 7 | CLIENT B | SECURITY UPDATE | KB920214 |
| 8 | CLIENT B | SECURITY UPDATE | KB920670 |
| 9 | CLIENT B | HOT FIX | KB885835 |
| 10 | CLIENT B | ANTIVIRUS SOFTWARE | Ver10,74.40.1,200X/04/24 rev25 |
| 11 | CLIENT C | SECURITY UPDATE | KB920214 |

220 SCHEDULE MANAGEMENT TABLE

| HOST NAME | SCHEDULE OF 200X/07/24 | SCHEDULE OF 200X/07/25 | SCHEDULE OF 200X/07/26 |
|---|---|---|---|
| CLIENT A | BUSINESS TRIP | BUSINESS TRIP | ROUTINE OF WORK |
| CLIENT B | ROUTINE OF WORK | ROUTINE OF WORK | ROUTINE OF WORK |
| CLIENT C | ROUTINE OF WORK | ROUTINE OF WORK | BUSINESS TRIP |
| CLIENT D | ROUTINE OF WORK | VACATION LEAVE | VACATION LEAVE |
| CLIENT E | ROUTINE OF WORK | ROUTINE OF WORK | ROUTINE OF WORK |
| CLIENT F | VACATION LEAVE | VACATION LEAVE | VACATION LEAVE |
| CLIENT G | ROUTINE OF WORK | ROUTINE OF WORK | ROUTINE OF WORK |

200A INVENTORY TABLE

| HOST NAME | IP ADDRESS | CPU | MEMORY | EMPTY HDD | CPU USE FACTOR | MEMORY USE FACTOR | POWER STATUS | MACHINE TYPE |
|---|---|---|---|---|---|---|---|---|
| CLIENT A | 192.168.0.2 | 500MHz | 1024MB | 60GB | 5% | 10% | ON | DESKTOP PC |
| CLIENT B | 192.168.0.3 | 1.0GHz | 1024MB | 45GB | 50% | 20% | ON | NOTE PC |
| CLIENT C | 192.168.0.4 | 1.5GHz | 512MB | 50GB | 10% | 10% | ON | DESKTOP PC |
| CLIENT D | 192.168.0.5 | 1.5GHz | 1024MB | 60GB | 40% | 25% | ON | DESKTOP PC |
| CLIENT E | 192.168.0.6 | 2.0GHz | 1024MB | 80GB | 60% | 30% | ON | DESKTOP PC |
| CLIENT F | 192.168.0.7 | 1.7GHz | 1024MB | 70GB | 0% | 0% | OFF | DESKTOP PC |
| CLIENT G | 192.168.0.8 | 1.0GHz | 512MB | 45GB | 35% | 25% | ON | NOTE PC |

801A DISTRIBUTION TARGET CLIENT LIST

JOB ID: 101

| ID | HOST ID | MACHINE TYPE | IP ADDRESS | DISTRIBUTION PRIORITY REPRESENTATIVE | DISTRIBUTION STATUS |
|---|---|---|---|---|---|
| 1 | CLIENT B | NOTE PC | 192.168.0.3 | CLIENT A | |
| 2 | CLIENT D | DESKTOP PC | 192.168.0.5 | CLIENT A | |
| 3 | CLIENT G | NOTE PC | 192.168.0.8 | CLIENT F | |
| 4 | CLIENT E | DESKTOP PC | 192.168.0.6 | CLIENT F | |
| 5 | CLIENT I | DESKTOP PC | 192.168.0.10 | CLIENT C | |

DISTRIBUTION MANAGEMENT METHOD, A DISTRIBUTION MANAGEMENT SYSTEM AND A DISTRIBUTION MANAGEMENT SERVER

CROSS-REFERENCE TO RELATED APPLICATION

The present application claims priority from Japanese application JP2008-102396 filed on Apr. 10, 2008 and Japanese application JP2008-264285 filed on Oct. 10, 2008, the contents of which are hereby incorporated by reference into this application.

BACKGROUND OF THE INVENTION

The present invention relates to a software distribution management method, a software distribution management system and a software distribution management server, and more particularly to techniques of selecting representative clients in charge of relay and techniques of collecting software distribution results.

There are techniques of reducing a load of a network during software distribution by providing a relay system between a distribution server and client terminals in a software distribution management system (e.g., refer to JP-A-HEI-9-146858). There is another software distribution management system in which a relay system is not provided positively, but a representative client terminal is provided which can substitute for the relay system, and is determined through communications among client terminals so that the representative client terminal can be set freely and cost of the distribution management system can be reduced (e.g., refer to JP-A-2006-309416).

SUMMARY OF THE INVENTION

However, the relay system is required to operate at all times, and moreover the relay system is required to be installed even for a small number of client terminals. There is therefore a problem that a running cost is not excellent.

With the method of setting the representative client terminal, although this method is excellent because the relay system is not required, a single representative client terminal is determined through communications among client terminals. There may therefore exist a case in which a client terminal suitable for the capacity and importance of software to be distributed by the distribution management server and for the number of distribution client terminals, is not selected as the representative client terminal.

Furthermore, since each client terminal is used by an end user, there arises a problem of a lowered distribution efficiency such as a delay of a software distribution result notice to the distribution management server to be caused by shutdown, fault, or change of the representative client terminal during a period until software is installed and a distribution result notice is issued after the software is received from the representative client terminal, The present invention solves the above-described problems and it is an object of the present invention to realize a distribution management system having a high distribution efficiency of software and using representative client terminals without providing a relay system between a distribution management server and client terminals, and to provide the distribution management system capable of reliably collecting distribution results independently from the statuses of client terminals.

In order to solve the above-described problems, according to one aspect of the present invention, a distribution management server of the present invention is provided with a method of determining representative client terminals in accordance with software distribution history (e.g., a job execution history table 300) of each client terminal stored in a database. With this method, a plurality of representative client terminals for software distribution relay are grouped, and the distribution management server monitors a distribution execution status of each representative client terminal and changes client terminals assigned to each representative client terminal for distribution in accordance with the monitored execution status.

According to another aspect of the present invention, each client terminal stores a list of representative client terminals grouped for each software distribution command so that a representative client terminal to which a distribution result is notified can be changed when the status of the representative client terminal changes.

According to still another aspect of the present invention, if network connection with all representative client terminals becomes impossible and the client terminals cannot notify distribution results, the distribution management server sets a new representative client for distribution result notice so that the distribution results can be notified reliably to the distribution management server.

According to the present invention, without providing a relay system between the distribution management server and each client terminal, a distribution efficiency of software by selected representative client terminals can be made high. Distribution results can be collected reliably independently from the status of each client terminal.

BRIEF DESCRIPTION OF THE DRAWINGS

FIG. 2 is a diagram showing an example of an inventory table.

FIG. 3 is a diagram showing an example of a job execution history table.

FIG. 7 is a diagram showing an example of a representative client group list.

FIG. 8 is a diagram showing an example of a distribution target client list.

FIG. 9 is a diagram showing an example of an execution job table.

FIG. 13 is a diagram showing an example of an executed job list.

FIG. 14 is a diagram showing an example of a representative group list.

FIG. 15 is a diagram showing an example of an unnotified result list.

FIG. 17 is a diagram showing an example of a job execution result table.

FIG. 22 is a diagram showing an example of a software inventory table.

FIG. 26 is a diagram showing an example of a schedule management table.

FIG. 27 is a diagram showing another example of the inventory table.

FIG. 30 is a diagram showing another example of the distribution target client list.

DESCRIPTION OF THE EMBODIMENT

An embodiment for practicing the present invention will be described in detail with reference to the accompanying drawings.

Figure 1:
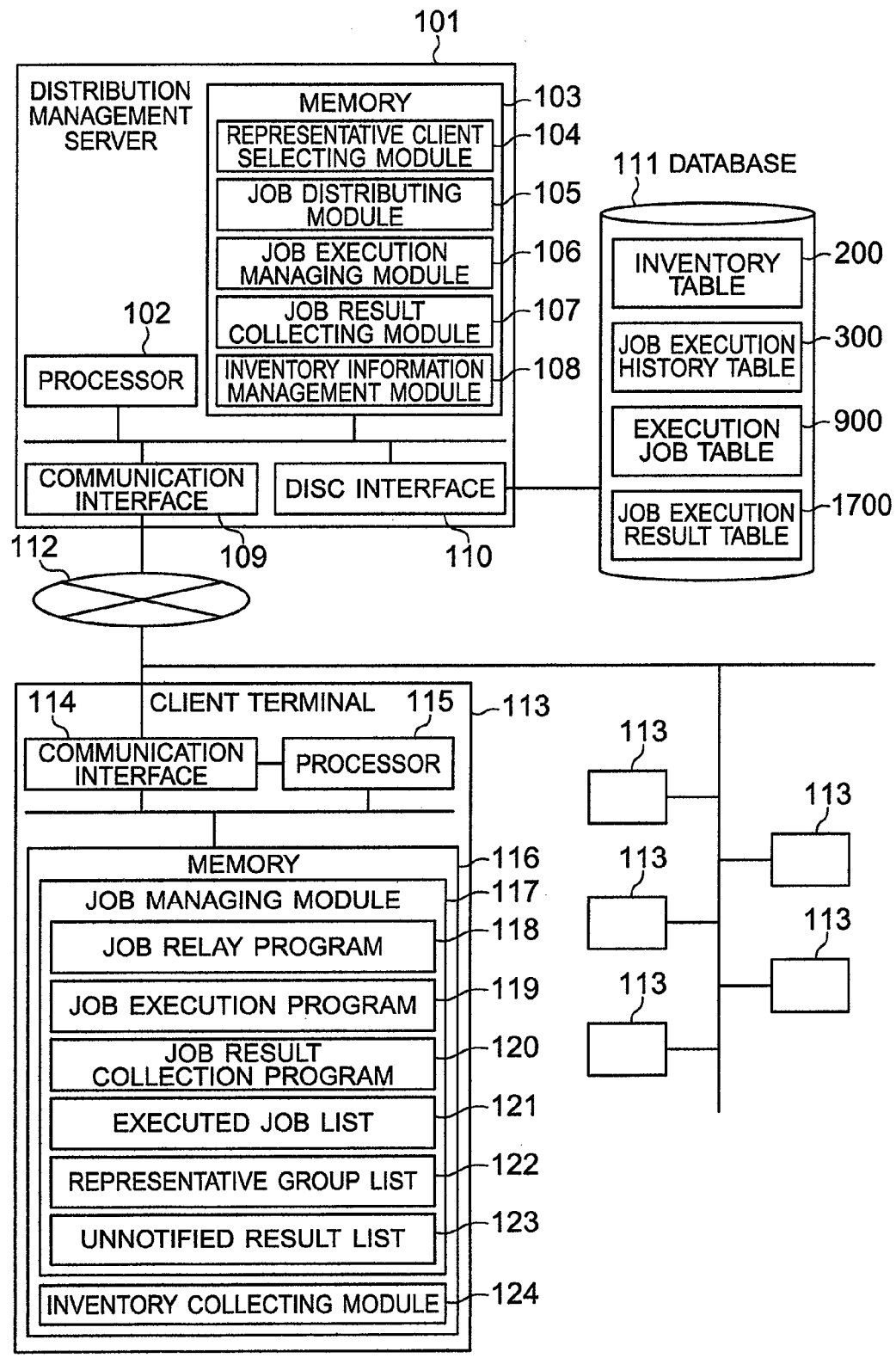
FIG. 1 is a diagram showing the configuration of a distribution management system.

FIG. 1 is a diagram showing the configuration of a distribution management system. The distribution management system has a distribution management server 101 and a plurality of client terminals 113. The distribution management server and client terminals are connected by a network 112. The number of client terminals 113 is not limited to the number of client terminals shown in FIG. 1.

The distribution management server 101 has a processor 102 and a memory 103, and is connected to the network 112 such as a local area network (LAN) and a wide area network (WAN) via a communication interface 109, and also to a database 111 realized by a storage such as a hard disc drive (HDD) via a disc interface 110. Each client terminal 113 has a processor 115 and a memory 116, and is connected to the network 112 such as LAN and WAN via a communication interface 114.

The processor 102 of the distribution management server 101 executes various programs stored in the memory 103. The database 111 stores various data to be used by the distribution management server 101 to execute each process. The memory 103 stores various programs to be executed by the distribution management server 101, and temporary data. Similarly, the processor 102 of each client terminal 113 executes various programs stored in the memory 116. The memory 116 stores various programs to be executed by the client terminal 113, and temporary data.

The database 111 of the distribution management server 101 stores an inventory table (inventory information) 200 (refer to FIG. 2), a job execution history table (distribution history information) 300 (refer to FIG. 3), an execution job table (execution job information) 900 (refer to FIG. 9), and a job execution result table (job execution result information) 1700 (refer to FIG. 17). The details of each table will be described later. The inventory means resource information of an information apparatus, such as information on the type of each client terminal 113, information on a clock number of CPU mounted on the information apparatus, information on a memory capacity and information on a hard disc capacity.

The memory 103 of the distribution management server 101 stores a representative client selecting module 104 (refer to FIG. 4), a job distributing module 105 (refer to FIG. 6), a job execution managing module 106 (refer to FIG. 16), a job result collecting module 107 (refer to FIG. 18), and an inventory information managing module 108.

When software is distributed (transmitted) to client terminals 113, the representative client selecting module 104 executes a process of selecting representative client terminals, which are client terminals 113 in charge of distribution relay, from client terminals 113, in accordance with a distribution command from an administrator.

The job distributing module 105 executes a process of creating a representative client group list 701 (refer to FIG. 7) of selected representative client terminals and a distribution target client list 801 (refer to FIG. 8), transmitting software to be distributed and various information necessary for software distribution to the selected representative client terminals, and storing the transmitted job information in the job table 900 (refer to FIG. 9) in the database 111. The details of the representative client group list 701 and distribution target client list 801 will be described later.

The job execution managing module 106 executes a process of storing results notified from the representative client terminals in the job execution result table 1700 (refer to FIG. 17) in the database 111, and managing the distribution status of each representative client terminal.

The job result collecting module 107 executes a process of collecting distribution result information of client terminals 113 not notifying the distribution results to the distribution management server 101, when a result notice term expires, and updating the job execution history table 300 (refer to FIG. 3) in the database 111.

The inventory information managing module 108 executes a process of collecting machine attribute information (host name, Internet protocol (IP) address, central processing unit (CPU), memory capacity, empty hard disc capacity, CPU use factor, memory use factor) of each client terminal 113, and storing the collected machine attribute information in the inventory table 200 (refer to FIG. 2) in the database 111.

The representative client selecting module 104, job distribution module 105, job execution managing module 106, job collecting module 107 and inventory information managing module 108 stored in the memory 103 are executed and realized by the processor 102 of the distribution management server 101.

The memory 116 of each client terminal 113 stores a job managing module 117 (refer to FIGS. 10 to 15 and FIG. 19) and an inventory collecting module 124. The job managing module 117 relays a distribution command received from the distribution management server 101 to another client terminal 113 or installs a received software and notifies an install result to the distribution server 101. The inventory collecting module 124 uploads (transmits) the machine attribute information of the client terminal 113 to the distribution management server 101.

The job managing module 117 has a job relay program 118 (refer to FIG. 10), a job execution program 119 (refer to FIGS. 11 and 12), a job result collection program 120 (refer to FIG. 19), an executed job list 121 (refer to FIG. 13), a representative group list (representative group information) 122 (refer to FIG. 14) and an unnotified result list (unnotified result information) 123 (refer to FIG. 15).

The job relay program 118 is a program having a function of, if the client terminal 113 is selected as the representative client terminal by the distribution management server 101, distributing a distribution command received from the distribution management server 101 to another client terminal 113 in accordance with the distribution target list, and notifying a distribution result to the distribution management server 101.

The job execution program 119 is a program having a function of installing software in accordance with the distribution command distributed from the representative client terminal, and notifying an install result to the representative client terminal.

The job result collecting program 120 is a program having a function of notifying the representative client terminal of a distribution result corresponding to a distribution command ID and not notified to the distribution management server 101 even expiration of the result notice term, in accordance with a result collection command from the job result collecting module 107.

The executed job list 121 (refer to FIG. 13) is a list recording the distribution command ID for which execution (software install) was performed by the job execution program 119. The representative group list 122 (refer to FIG. 14) is a list recording a distribution command ID for the distribution command, a group ID of a representative client group, and a host name and an IP address of a client terminal 113 assigned as the representative client terminal. The unnotified result list 123 (refer to FIG. 15) is a list recording the distribution command ID of a distribution command whose result was not able to be notified to the representative client terminal, and result information to be notified.

FIG. 2 is a diagram showing an example of the inventory table. The inventory table 200 to be stored in the database 111 (refer to FIG. 1) stores various machine attribute information of each client terminal 113 to be managed. The machine attribute information includes a host name 201, an IP address 202, a CPU clock number 203, a memory capacity 204, an empty hard disc (HDD) capacity 205, and a current CPU use factor 206 and a current memory use factor 207 by the client terminal 113. The inventory table 200 is updated by the inventory information managing module 108 of the distribution management server 101 shown in FIG. 1 in accordance with inventory information uploaded from the inventory collecting module 124 of each client 113.

The inventory information managing module 108 acquires the inventory information of each client 113 either periodically at an interval of a predetermined period or irregularly.

FIG. 3 is a diagram showing an example of the job execution history table. The job execution history table 300 to be stored in the database 111 (refer to FIG. 1) is a table for managing, for each file size (file capacity) of software to be distributed and for each of distribution target clients 113 corresponding in number to a distribution target client number, an average time taken for each client terminal selected as the representative client terminal to distribute software to each client and notify the result to the distribution management server 101. This average time corresponds to past distribution actual performance information. For example, the job execution history table 300 stores a file size 301 of software, a software distribution target client number 302, a host name 303 of each client terminal 113, an average distribution time 304 per client taken for each client selected as the representative client terminal to distribute software.

The job execution history table 300 is referred when the representative client selecting module 104 selects representative client terminals, and is updated in accordance with result information notified from each client terminal 113 by the job result collecting module 107. The job execution history table 300 may manage software distribution actual performance by a combination of representative client terminals. For a client terminal 113 not registered, the job execution history table 300 may be initialized in accordance with the inventory information.

Figure 4:
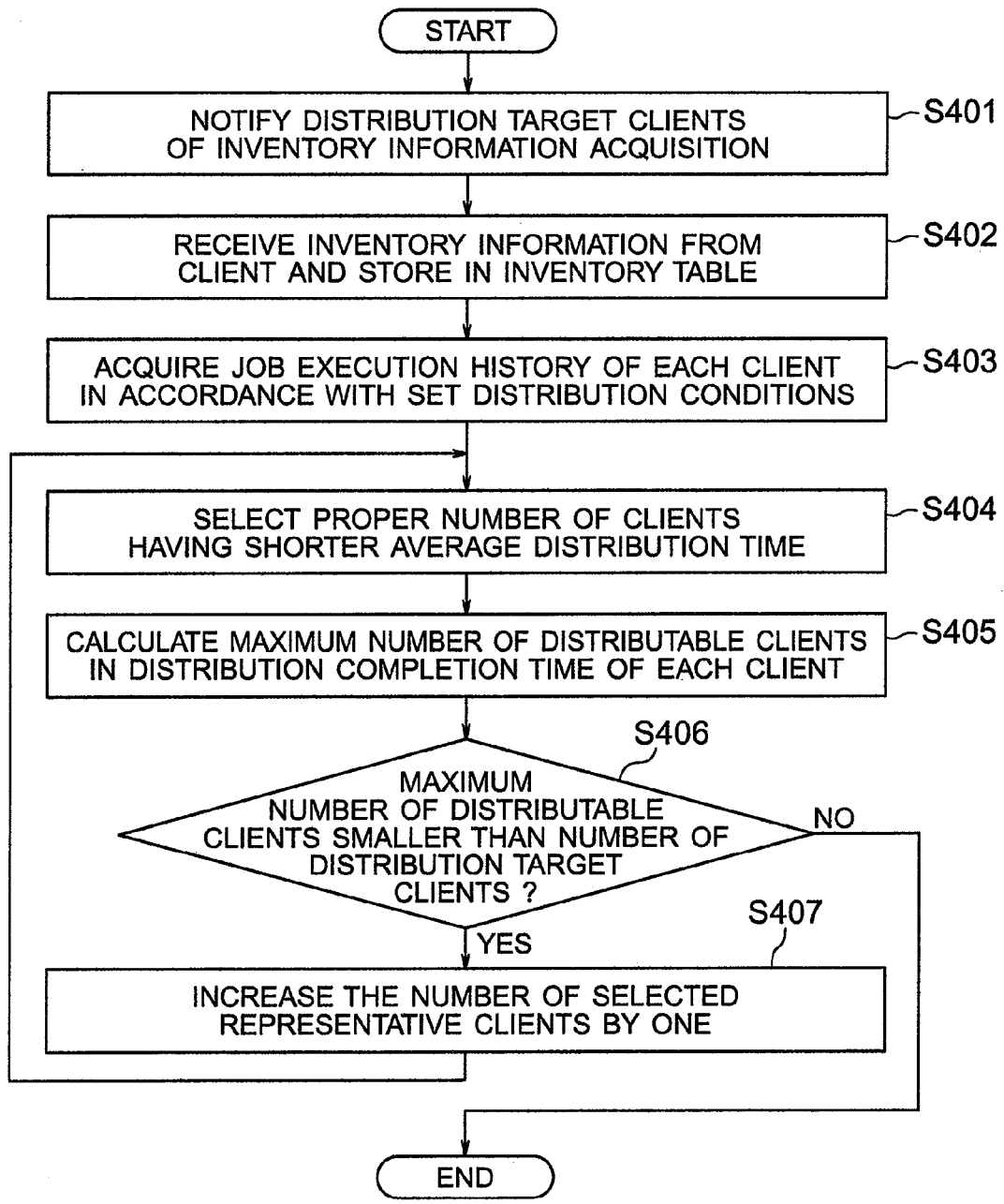
FIG. 4 is a flow chart illustrating processes to be executed by a representative client selecting module.

FIG. 4 is a flow chart illustrating processes to be executed by the representative client selecting module. When software is to be distributed (transmitted) to each client terminal 113, the representative client selecting module 104 of the distribution management server 101 (refer to FIG. 1) executes a process of selecting client terminals 113 (hereinafter called representative client terminals) in charge of distribution relay from the client terminals 113, in accordance with the distribution commands from a system administrator. More specifically, the representative client selecting module 104 starts upon an event that the system administrator issues the distribution command designating software to be distributed to each client terminal 113, distribution target client terminals 113, a selection policy for representatives, a distribution completion time and a result notice term, by using an input/output device such as a monitor, a mouth and a keyboard.

The representative client selecting module 104 transmits an inventory information collection/notice command to each client terminal 113 (Step S401), and stores inventory information received from each client terminal 113 in the inventory table 200 (refer to FIG. 2) (Step S402). Next, by using three items of a file size 301 of software to be distributed, the number of distribution target clients 302 and a policy, as the representative client terminal selection conditions, a host name 303 and an average distribution time 304 satisfying the selection conditions are acquired from the job execution history table 300 (refer to FIG. 3) (Step S403).

The policy designates upper limits of a CPU use factor and a memory use factor. For example, if an input of a CPU use factor of 30% is received, the representative client selecting module 104 refers to a CPU use factor 206 of the inventory table 200, and acquires job execution history of client terminals 113 having a CPU use factor not higher than 30% from the job execution history table 300.

In accordance with the acquired history information, a number of representative clients are selected as representative client candidates in charge of distribution, in the order of the client terminal 113 having a shorter average distribution time (Step S404). Selecting a number of representative clients means selecting one or more representative clients and using one or more representative clients for job execution. In accordance with the distribution completion time and average distribution time, a maximum number of client terminals for which distribution can be completed by each client terminal 113 in the distribution completion time, is calculated (Step S405). It is judged whether the maximum number of distributable clients (a total number of distributable clients) is smaller than the number of distribution target clients (Step S406). If the maximum number of distributable clients is not smaller than the number of distribution target clients (No at Step S406), the selected client terminals 113 are selected as the representative client terminals in charge of relay substituted for the representative client candidates.

If the maximum number of distributable clients is smaller than the number of distribution target clients (Yes at Step S406), it is judged that the distribution conditions are not satisfied, the number of selected representative clients is increased by one (Step S407), and representative client terminals are selected again as representative client candidates (Step S404). After the representative client terminals are selected, whether software distribution is completed in the distribution completion time may be judged from distribution simulation.

Figure 5:
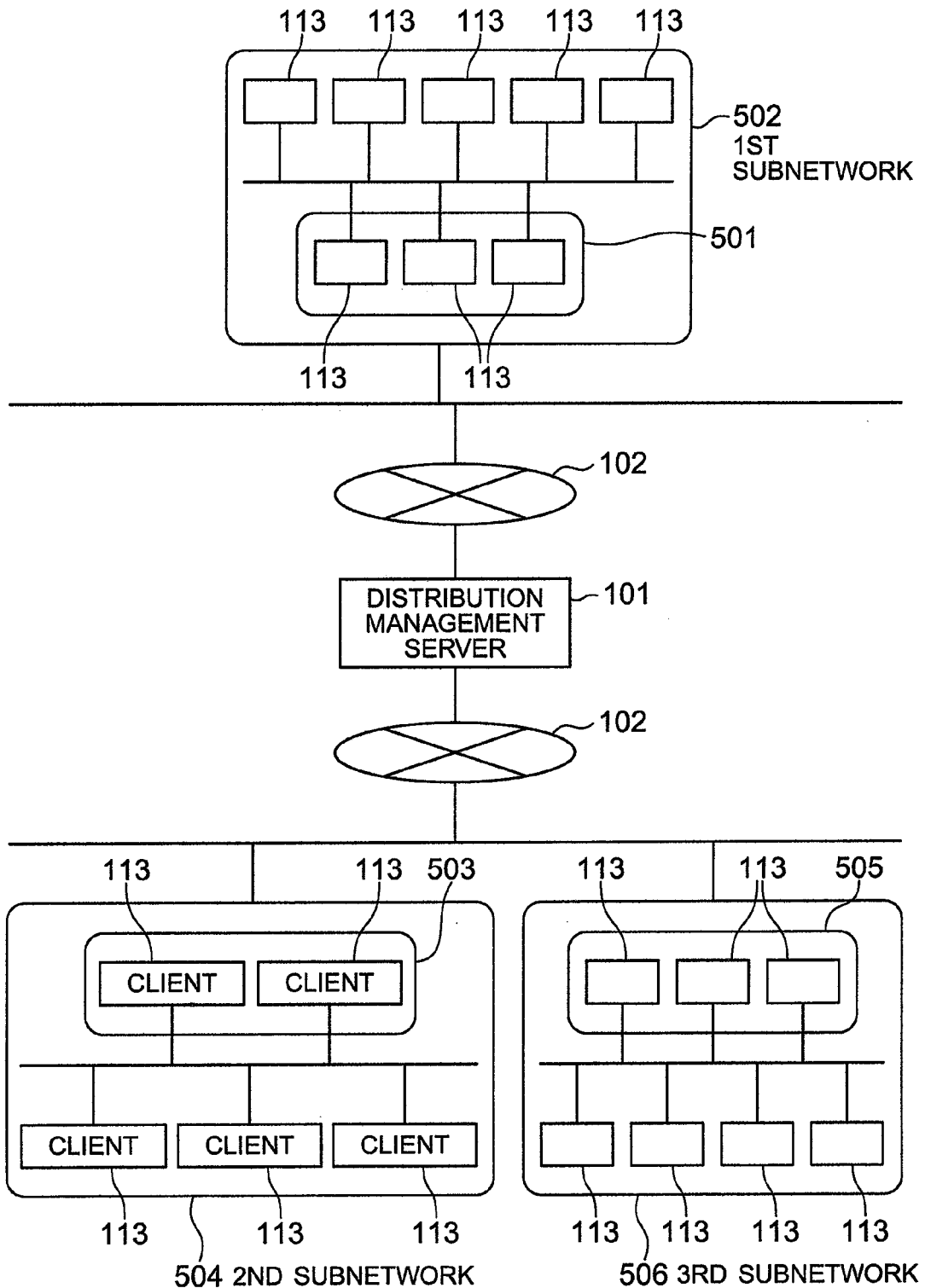
FIG. 5 is an illustrative diagram showing a system configuration after representative client terminals are selected.

FIG. 5 is an illustrative diagram showing the system configuration after representative client terminals are selected. Representative client terminals are selected for each of a first subnetwork 502, a second subnetwork 504 and a third subnetwork 506. Representative client groups 501, 503 and 505 assigned with unique IDs by the distribution management server 101 are set to the representative client terminals selected for each subnetwork, and are in charge of a relay role for transmitting software received from the distribution management server 101 to client terminals 113.

The distribution management server 101 transmits the same distribution command to representative client terminals of each representative client group. By setting a plurality of representative client terminals to one representative client group, there is a merit that the distribution management server 101 generates only one distribution command. Even if shutdown or fault of the representative client terminal occurs, another representative client terminal in the same representative group can continue distribution to the client terminals 113.

Figure 6:
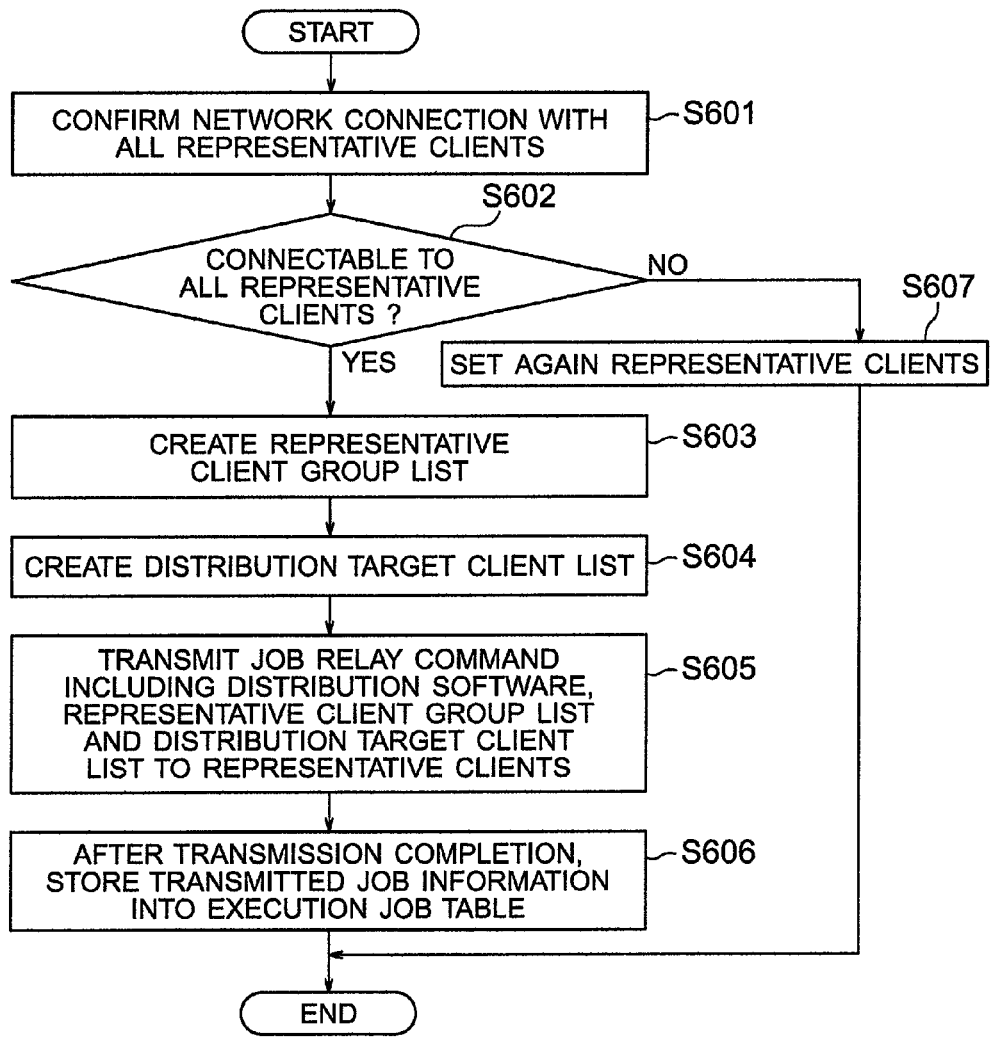
FIG. 6 is a flow chart illustrating processes to be executed by a job distributing module.

FIG. 6 is a flow chart illustrating processes to be executed by the job distributing module. The job distributing module 105 of the distribution management server 101 (refer to FIG. 1) is executed upon an event that the representative client selecting module 104 completes selection of representative client terminals. First, the job distributing module 105 confirms network connection to all representative client terminals 113 (Step S601), and judges whether all representative client terminals 113 can be connected (Step S602). If even one terminal cannot be connected (No at Step S602), the process is terminated to set again representative client terminals, and the process is returned to the representative client selecting module 104 (Step S607). If all representative client terminals are connectable (Yes at Step S602), a representative client group list 701 (refer to FIG. 7) is created (Step S603), a distribution target client list 801 (refer to FIG. 8) is created (Step S604), and software to be distributed and a job relay command are transmitted to all representative client terminals (Step S605). After transmission completion, information regarding the executed command is stored in the execution job table 900 (refer to FIG. 9) (Step S606).

FIG. 7 is a diagram showing an example of the representative client group list. The representative client group list 701 created by the job distributing module 105 (refer to FIG. 1) when a job is executed is constituted of: a unique job ID assigned for identifying a distribution command to be executed; a group ID assigned to the representative client group; a host name and an IP address of each client terminal 113 selected as the representative client terminal.

FIG. 8 is a diagram showing an example of the distribution target client list. The distribution target client list 801 created by the job distributing module 105 (refer to FIG. 1) when a job is executed is constituted of: a unique job ID assigned for identifying a distribution command to be executed; a host name and an IP address of each client terminal 113 as a software distribution target; and each distribution priority representative client setting representative of which representative client terminal is made to be distributed preferentially.

In setting distribution priority representative clients, in accordance with the maximum number (value) of client terminals, whose distribution can be completed by each representative client terminal, and calculated by the representative client selecting module 104, the maximum value is divisionally assigned sequentially from the top of the list. The distribution status is used by the representative client terminal to set a flag indicating a presence/absence of software distribution to the client terminal. More specifically, after distribution (transmission) completion of software to the client terminals, the representative client terminal sets a distribution completion flag to the distribution status.

FIG. 9 is a diagram showing an example of the execution job table. The execution job table 900 to be stored in the database 111 stores: for each executed distribution command, a job ID 901 of the distribution command; a group ID 902 of the set representative client group 902; a representative client 903 for storing host names of representative clients belonging to the group; a distribution target client 904 for storing host names of client terminals 113 to which the software is distributed; a job result notice term 905 indicating a distribution command result notice term; and a job completion time 906 indicating an actual time of distribution command completion.

For example, in the case of the job ID of 101 shown in FIG. 9, the representative client 903 indicates client A, client C and client F which correspond to the representative client group 701 shown in FIG. 7. Similarly, the distribution target client 904 includes client B, client D, client E, client G, . . . which correspond to the distribution target client list 801 shown in FIG. 8. The job result notice term 905 is Jan. 1, 2008, 17:00 (Jan. 1, 2008 17:00), and the job completion time 906 is Jan. 1, 2008, 13:00 (Jan. 1, 2008 13:00).

Figure 10:
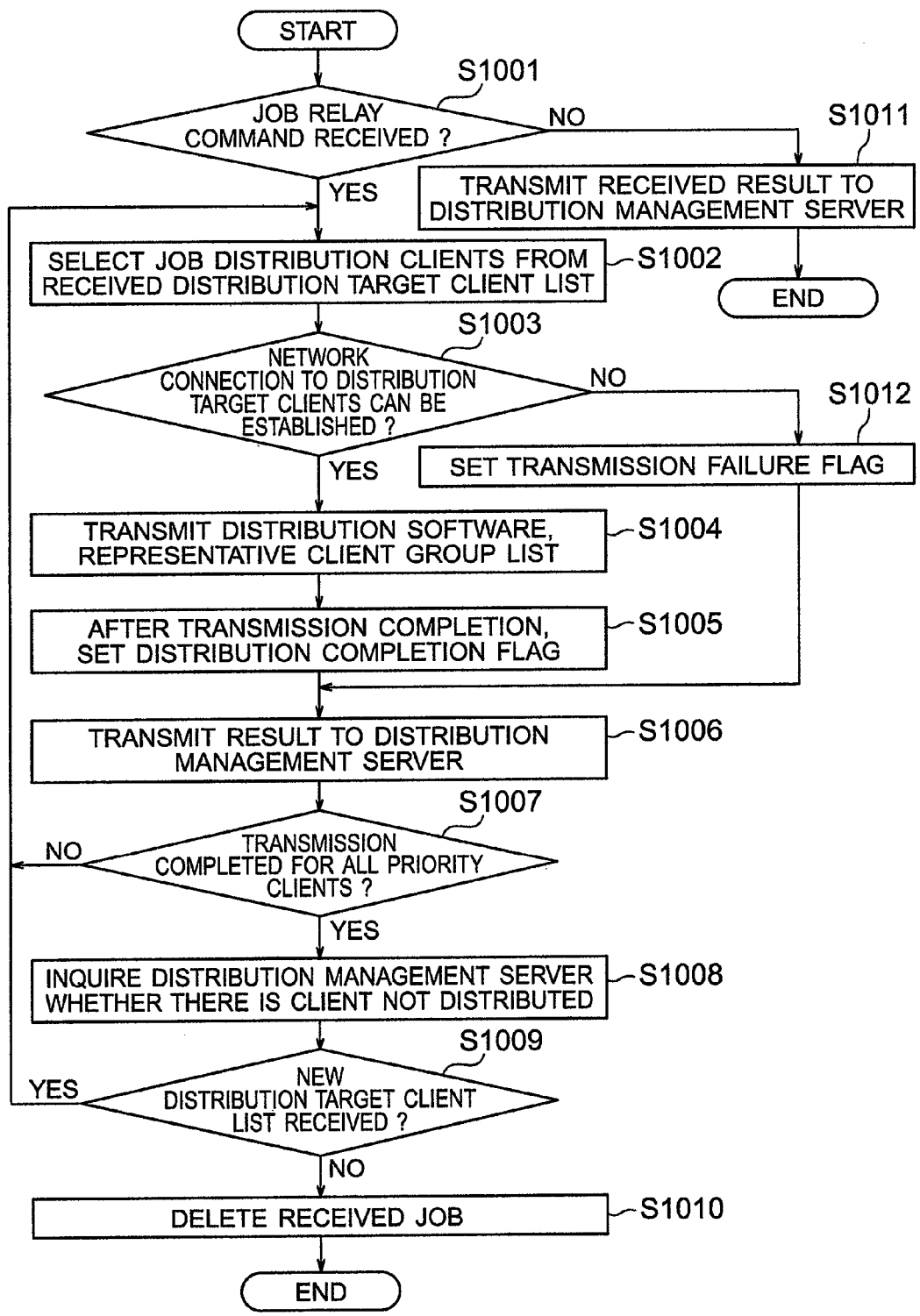
FIG. 10 is a flow chart illustrating processes to be executed by a job relay program.

FIG. 10 is a flow chart illustrating processes to be executed by the job relay program. The job relay program 118 of the job managing module 117 of the client terminal 113 is executed upon reception, as the representative client terminal, of a distribution command from the distribution management server 101 or of an install result (distribution result) of distributed software from the client terminal 113.

Upon reception of a command from the distribution management server 101 or client terminal 113, the job relay program 118 judges whether the received command is a relay command (distribution command) (Step S1001). If the command is the job relay command (Yes at Step S1001), job distribution clients are selected from the received distribution target client list 801 (Step S1002). More specifically, information on the host name and IP address of the client terminal 113 set as the distribution priority representative is acquired sequentially from the received distribution target client list 801 in the order of ID, On the other hand, if the received command is not the job relay command (No at Step S1001), i.e., if result information is received from the client terminal 113, the received result is directly transmitted to the distribution management server 101 to thereafter terminate the process (Step 1011).

Next, after the process at Step S1002, it is judged whether network connection to the distribution target clients is possible (Step S1003). More specifically, network connection is confirmed relative to the host acquired from the distribution target client list 801, i.e., the client terminal 113 to which software is to be distributed. If connectable (Yes at Step S1003), the software to be distributed and the representative client group list 701 are transmitted (Step S1004), and after transmission completion, a distribution completion flag is set as the distribution result (Step S1005). The distribution result and the host name and job ID of the distribution target client terminal 113 are transmitted to the distribution management server 101 (Step S1006).

If network connection to the client terminal 113 cannot be established (No at Step S1003), a transmission failure flag is set as the distribution result (Step S1012) to thereafter advance to Step S1006.

After the process at Step S1006, it is judged whether transmission has been completed for all priority clients (Step S1007). More specifically, it is judged whether the distribution process has been completed for all client terminals 113 whose hosts are set as distribution priority representatives in the distribution target client list 801. If transmission is not completed (No at Step S1007), the process returns to the process at Step S1002. If the distribution (transmission) process has been completed for all client terminals 113 (Yes at Step S1007), the distribution management server 101 is inquired whether there is a client terminal 113 whose software distribution is still not completed as the task of another representative client terminal (Step S1008).

It is judged whether a new distribution target client list 801 is received as the inquiry result (Step S1009). If received (Yes at Step S1009), the process returns to Step S1002. At Step S1002, the distribution process is executed for the client terminal 113 to which software is not still distributed. If a new distribution target client list is not received as the inquiry result (No at Step S1009), i.e., if a job completion command is received, the received job relay command is deleted (Step S1010) to thereafter terminate the process.

Figure 11:
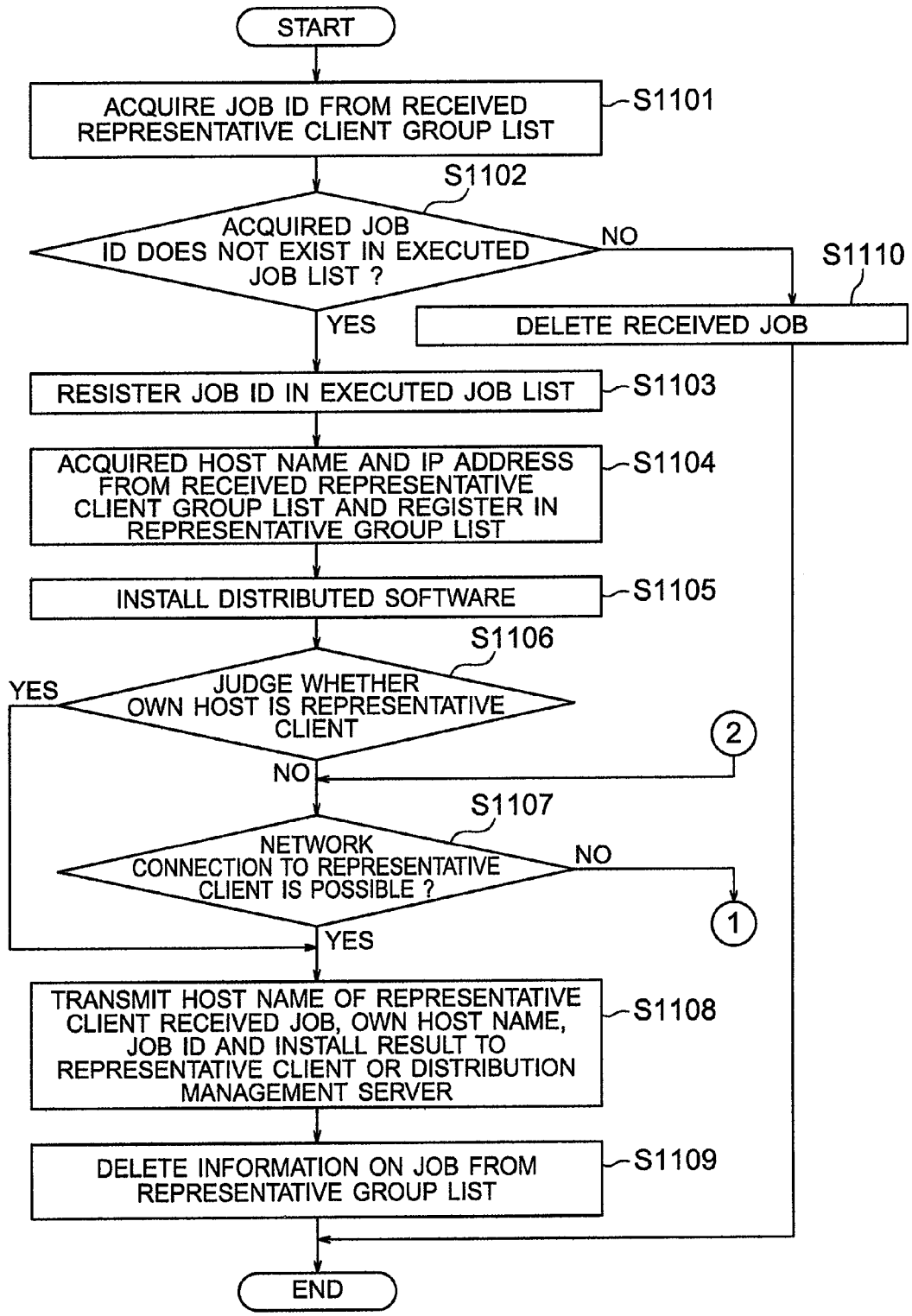
FIG. 11 is a flow chart illustrating processes to be executed by a job execution program.
Figure 12:
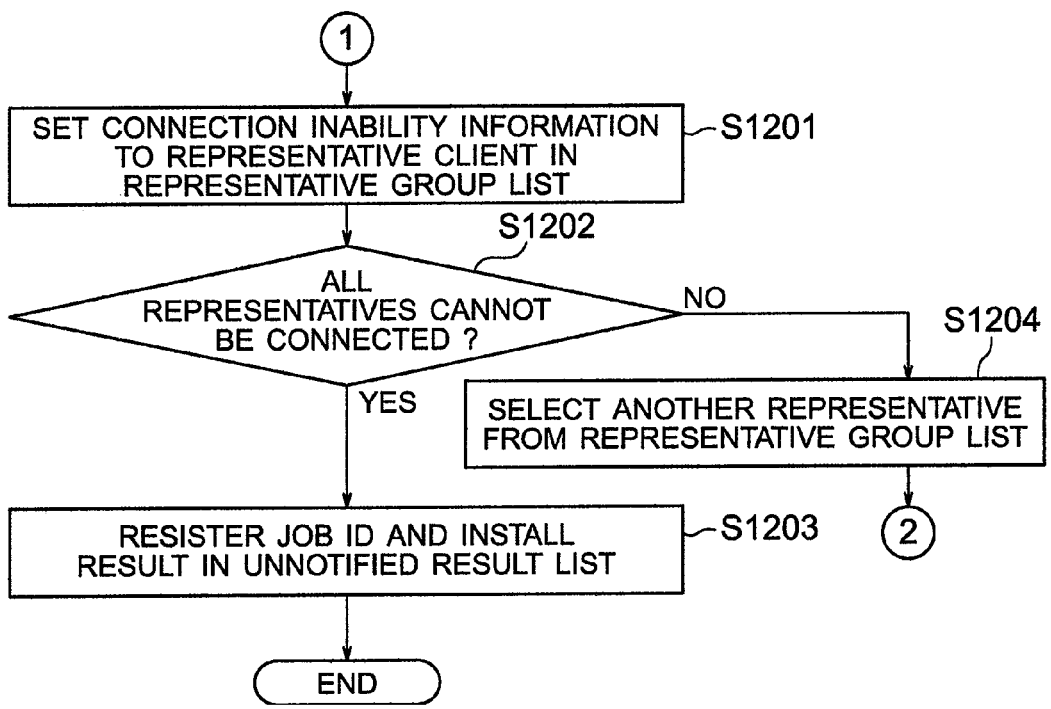
FIG. 12 is a flow chart illustrating processes to be executed by the job execution program.

FIGS. 11 and 12 are flow charts illustrating processes to be executed by the job execution program. The job execution program of the job managing module 117 of the client terminal 113 (refer to FIG. 1) is executed when the software to be installed and the representative client group list 701 (refer to FIG. 7) are received from the representative client terminal, and acquires a job ID from the representative client group list 701 (Step S1101). Next, it is judged whether the acquired job ID exists in the executed job list 121 (refer to FIG. 13) managed by the job managing module 117 (Step S1102). If the acquired job ID exists in the executed job list 121 (No at Step S1102), the received distribution command (received job) is deleted (Step S1110) to thereafter terminate the process. If the acquired job ID does not exist in the executed job list 121 (Yes at Step S1102), the acquired job ID is registered in the executed job list 121 (Step S1103). Host names and IP addresses of all representative client terminals selected by the distribution command are acquired from the received representative client group list 701 and registered in the representative group list 122 (refer to FIG. 14) (Step S1104). Thereafter, the distributed software is installed (Step S1105).

After the install process is completed, it is judged from the representative client group list 701 whether its own host is designated as the representative client in the distribution command (Step S1106). If the host is the representative client (Yes at Step 1106), the process advances to Step S1108 whereat a host name of the representative client terminal from which the job was received, a host name (own host name) of own client terminal, the job ID, and an install result are transmitted to the distribution management server.

If the own host is not the representative client (No at Step S1106), in order to notify the install result to the distribution management server 101 via the representative client terminal, network connection is confirmed relative to the representative client terminal from which the distribution command was received (Step S1107). If connection is possible relative to the representative client terminal (Yes at S1107), a host name of the representative client terminal from which the job was received, a host name of own client terminal, the job ID, and an install result are transmitted to the representative client (Step S1108). After the result transmission to the distribution management server or representative client is completed, information on the job is deleted from the representative group list 122 (Step S1109) to thereafter terminate the process.

If connection to the representative client terminal to which the distribution result is to be transmitted is not possible by any possibility such as a fault (No at Step S1107), a connection inability flag (connection inability information) is set to the representative client terminal in the representative group list 122 (Step S1201). It is judged whether all representative client terminals in the representative group list 122 cannot be connected (Step 1202). If all representative client terminals in the representative group list 122 cannot be connected (Yes at Step 1202), the job ID and install result are set to the unnotified result list (Step S1203) to thereafter terminate the process.

If connection confirmation to all representative client terminals is still not completed (No at Step S1202), a representative client terminal to which network connection is established next is selected from the representative group list 122 (Step S1204) to thereafter advance the process to Step S1107. If the network connection is confirmed and is possible, the result is transmitted to the selected representative client terminal.

FIG. 13 is a diagram showing an example of the executed job list. The executed job list 121 of the job managing module 117 is a list of job IDs of received and executed distribution commands, and is used for preventing duplicate execution of the same distribution command.

FIG. 14 is a diagram showing an example of the representative group list. The representative group list 122 of the job managing module 117 is constituted of: a job ID of a received distribution command; a group ID of the representative client group set for the job; a representative client indicated by a host name; and a connection status to the representative client terminal at the time of result notice.

FIG. 15 is a diagram showing an example of the unnotified result list. The unnotified result list 123 of the job managing module 117 is created if all representative client terminals cannot be connected when the client terminal 113 notifies a software install result, and set with a job ID and an install result.

Figure 16:
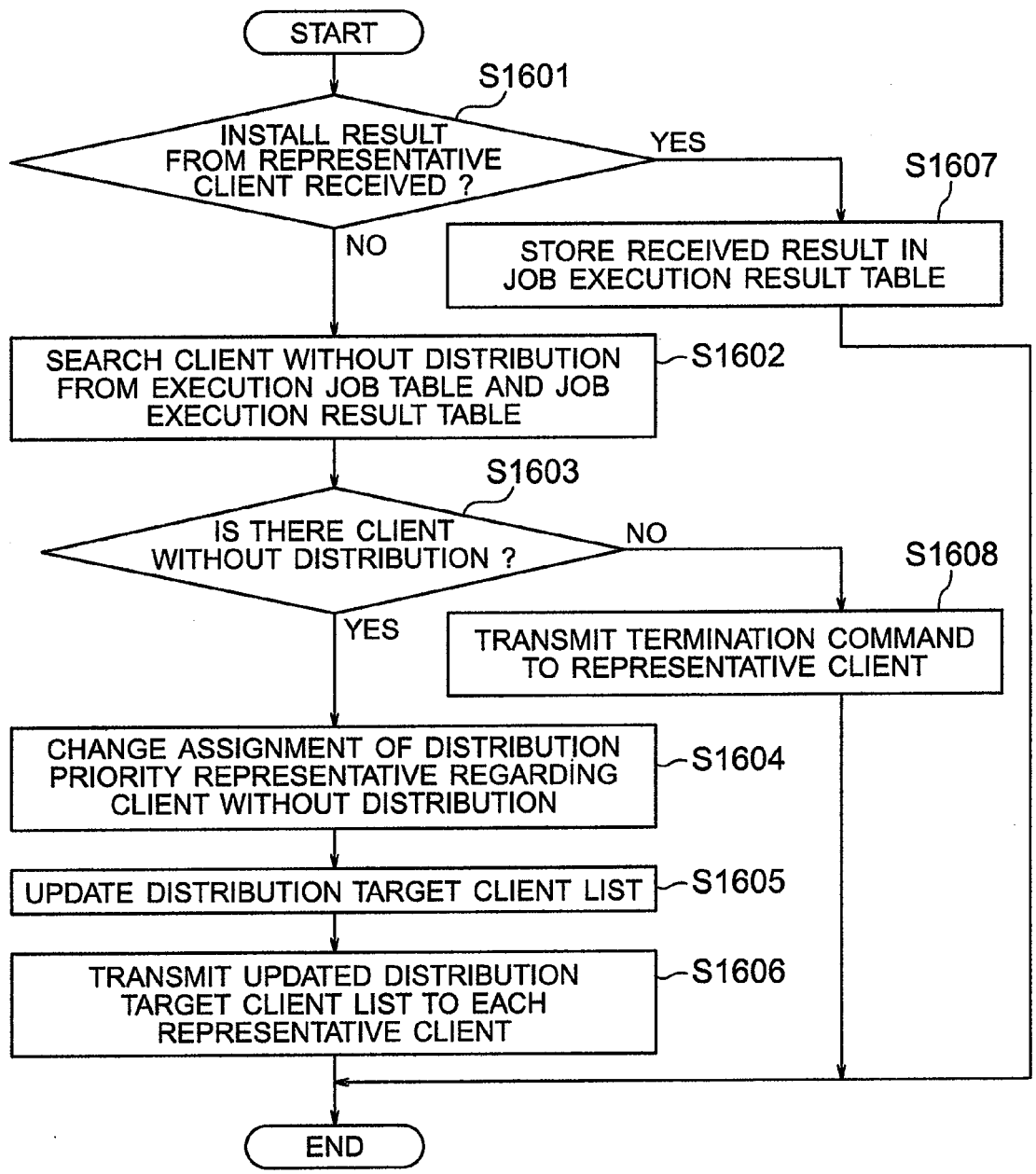
FIG. 16 is a flow chart illustrating processes to be executed by a job execution managing module.

FIG. 16 is a flow chart illustrating processes to be executed by the job execution managing module. The job execution managing module 106 of the distribution management server 101 (refer to FIG. 1) is executed upon reception of an inquiry (corresponding to the inquiry at Step S1008 in FIG. 10) from the representative client terminal whether there is a client not distributed with software corresponding to the distribution command or of an install result (corresponding to Step S1011 in FIG. 10) notified from the client terminal via the representative client terminal.

First, the job execution managing module 106 judges whether the install result has been received from the representative client terminal (Step S1601). If the install result has been received (Yes at Step S1601), the received result and the received date ant time are stored in the job execution result table 1700 (refer to FIG. 17) (Step S1607) to thereafter terminate the process. If the received information is not the install result (No at Step S1601), i.e., if the received information is an inquiry from the representative client terminal 113, by using the host name in the execution job table 900 (refer to FIG. 9) and job execution result table 1700 as a key, search is conducted for the client still not distributed with software, i.e., the client terminal 113 whose data is not stored in the job execution table 1700 (Step S1602).

It is judged whether there is a client terminal 113 still not distributed with software (Step S1603). If there is a client terminal 113 without distribution (Yes at Step S1603), assignment of a distribution priority representative regarding the client terminal 113 without distribution is changed to the inquired representative client terminal (Step S1604), and the distribution target client list 801 is updated (Step S1605).

The number of clients without distribution to be changed to the distribution priority representatives is set to a number (omitting numbers lower than the decimal point) obtained by dividing a time from a present time to the set distribution completion time by the average distribution time of the inquired representative client terminal. If the distribution completion time elapses, the number is obtained by dividing the number of clients without distribution by the number of representative client terminals.

The updated distribution client list 801 is transmitted to each representative client terminal (Step S1606) to thereafter terminate the process. Each representative client terminal executes a software distribution process in accordance with the updated distribution target client list 801.

If software distribution is completed for all client terminals 113 (No at Step S1603), a termination command for the distribution command is transmitted to the inquired representative client (Step S1608) to thereafter terminate the process. Steps S1604 and S1606 mean that clients to whom software is distributed from each representative client are changed on the group unit (group ID) basis.

FIG. 17 is a diagram showing an example of the job execution result table. The job execution result table 1700 to be stored in the database 111 (refer to FIG. 1) is updated upon an event that a distribution result is received from the representative client terminal. This table aims to confirm an execution status of each distribution command by storing an execution result at each client terminal 113 for each distribution command executed by the distribution management server 101. The job execution result table 1700 records: a job ID 1701; a host name 1702 of each client terminal 113 as a job execution target; a status 1703 indicating an execution status; a distribution representative 1704 indicating a host name of the representative client terminal distributed the distribution command to the client terminal 113; and a result notice time 1705.

Figure 18:
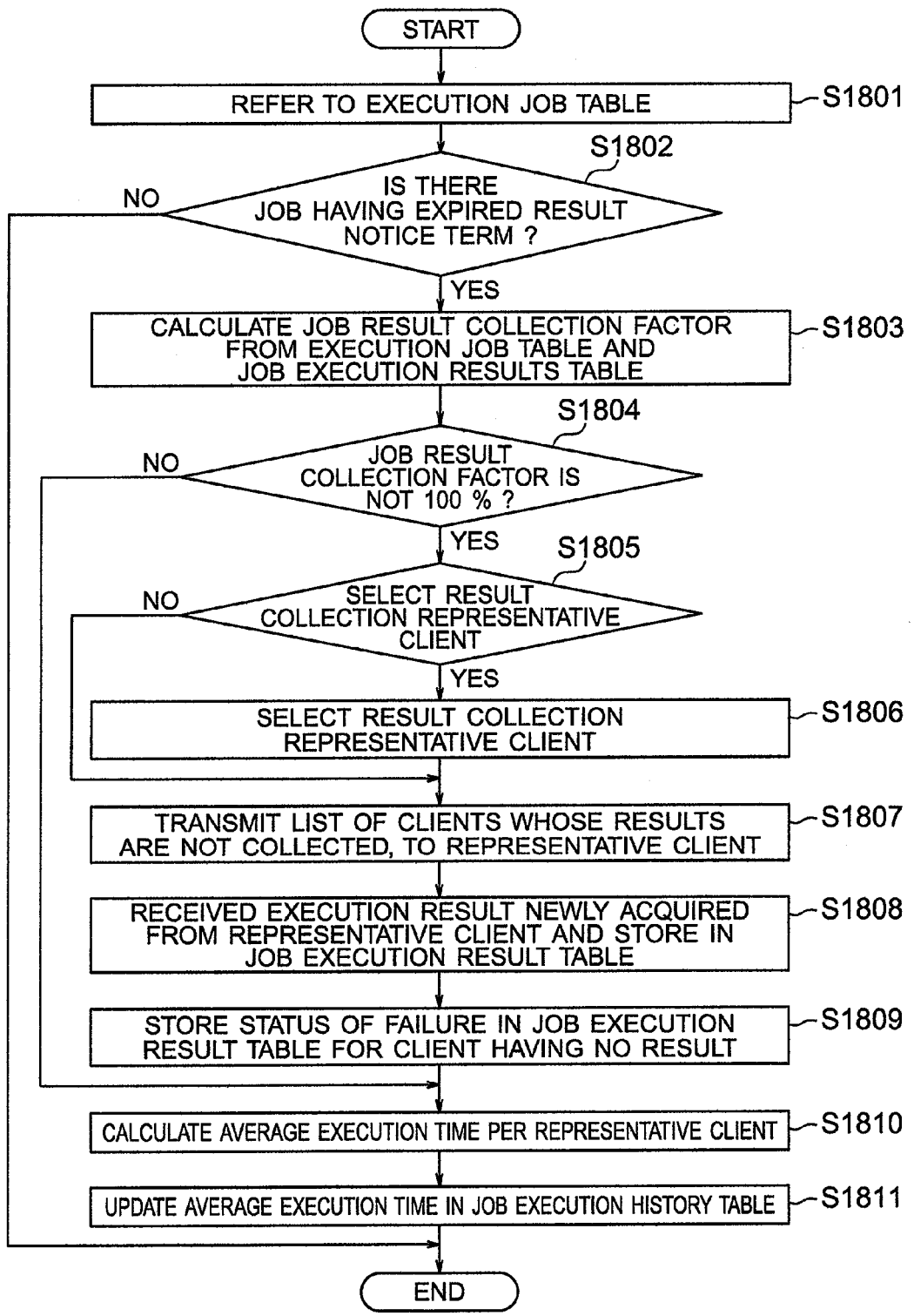
FIG. 18 is a flow chart illustrating processes to be executed by a job result collecting module.

FIG. 18 is a flow chart illustrating processes to be executed by the job result collecting module. The job result collecting module 107 of the distribution management server 101 (refer to FIG. 1) is executed when the result notice term expires (may be executed at an arbitrary timing before the term, depending on system settings), and aims to collect the distribution results of the client terminal 113 not notifying the distribution result to the distribution management server 101.

First, the job result collecting module 107 periodically refers to the execution job table 900 (refer to FIG. 9) (Step S1801), and searches whether there is a distribution command having an expired job result notice term 905 (Step S1802). If there is a distribution command having an expired job result notice term 905 (Yes at Step S1802), the distribution target clients 904 in the execution job table 900 and host names 1702 in the job execution result table 1700 (refer to FIG. 17) are acquired for the job ID 901 to calculate a distribution result collection factor (Step S1803). It is judged whether the calculated collection factor (job result collection factor) is 100% (Step S1804). If not 100% (Yes at Step S1804), network connection to all client terminals 113 set to the representative client terminal for the distribution command is confirmed, and judges whether connection cannot be established to all representative clients (Step S1805). If all representative clients can be connected (No at Step S1805), a client list listing clients whose distribution results are not collected is transmitted as a result collection command to the representative client terminal (Step S1807). If the calculated collection factor is 100% (No at Step S1804), the process advances to Step S1810.

If network connection cannot be established to all representative client terminals (Yes at Step S1805), a new result collection representative client terminal is selected (Step S1806), and the client list listing clients whose distribution results are not collected is transmitted to the newly selected representative client terminal.

As the method of selecting the result collection representative client terminal, it is assumed that the client terminals 113 having a shorter average distribution time 304 in the job execution history table 300 (refer to FIG. 3) are selected corresponding in number to the number of representative clients set for the distribution command (the policy for executing the distribution command may be stored, and the client terminals 113 having machine attributes satisfying the policy may be selected as the representative client terminals).

When distribution results are notified from the representative clients, newly acquired execution results are stored in the job execution result table 1700 (Step S1808), and a status of fault is stored as the distribution result for the client terminal 113 whose distribution result is not stored even if the result collection command is used (Step S1809). Thereafter, in accordance with the distribution representative 1704 and result notice time 1705 in the job execution result table 1700, an average distribution time of each representative client terminal is calculated (Step S1810) and the average distribution time 304 of the job execution history table 100 is updated (Step S1811). By managing the distribution result history in this manner, the distribution command can be generated at high precision.

Figure 19:
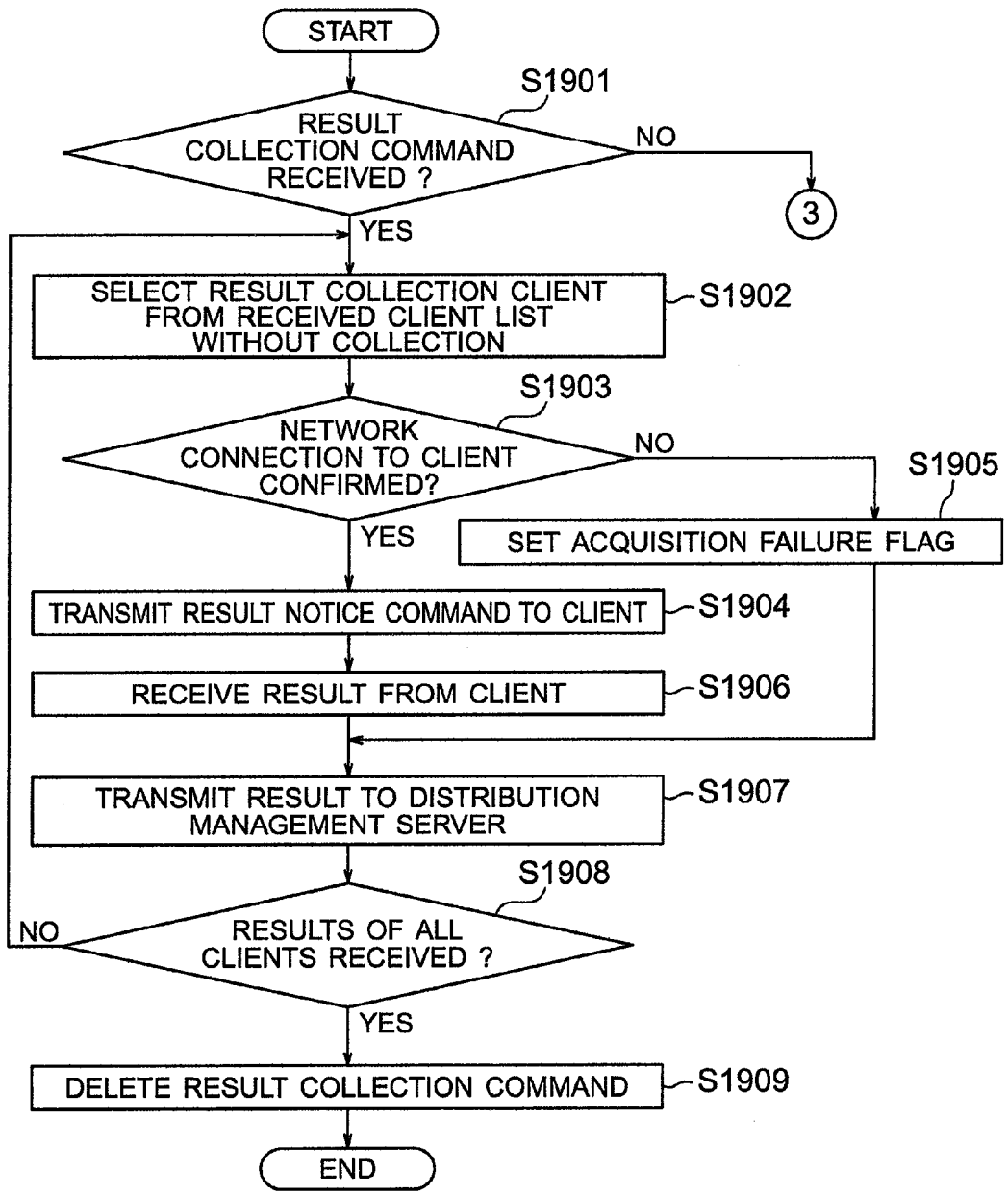
FIG. 19 is a flow chart illustrating processes to be executed by a job result collection program.
Figure 20:
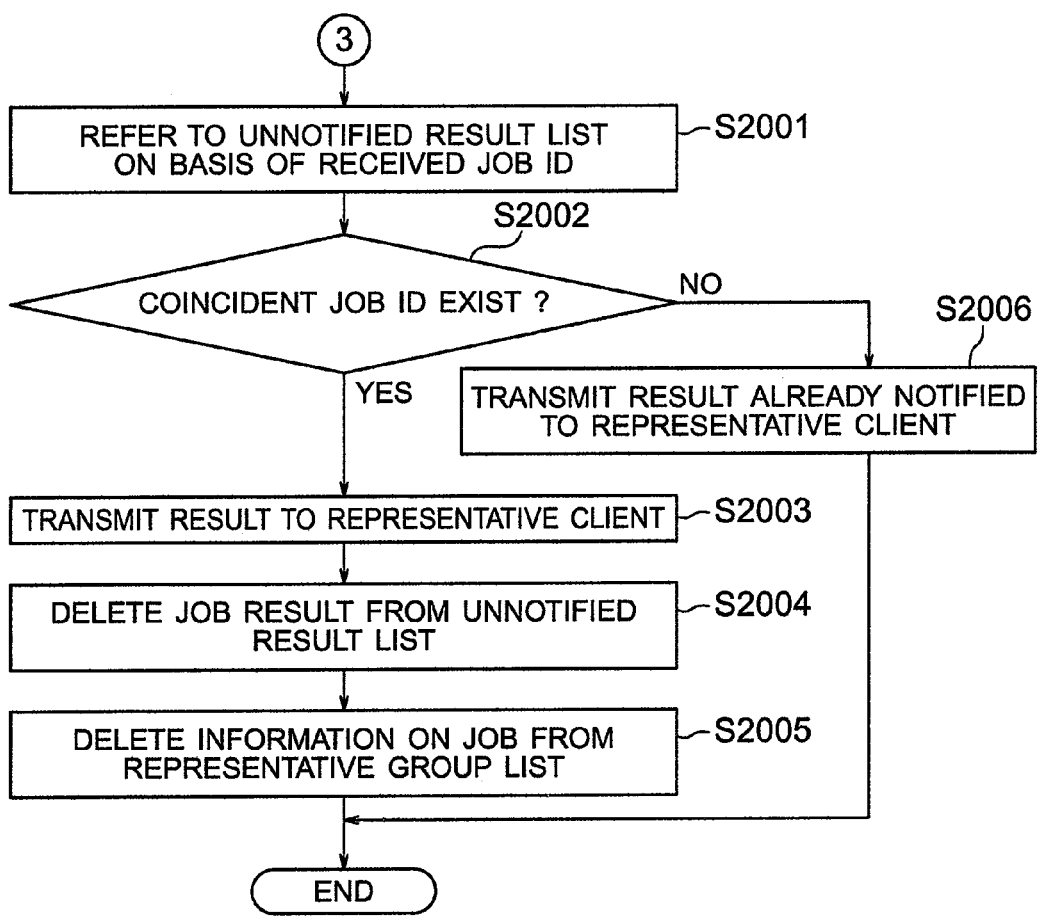
FIG. 20 is a flow chart illustrating processes to be executed by the job result collection program.

FIGS. 19 and 20 are flow charts illustrating processes to be executed by the job result collection program. The job result collection program 120 in the job managing module of the client terminal 113 (refer to FIG. 1) is executed upon reception of a result collection command from the distribution management server 101 or a result notice command from the representative client terminal.

First, it is judged whether the received information is a result collection command (Step S1901), and if the received information is the result collection command (Yes at Step S1901), the job ID and host name of the client terminal 113 from which the distribution result is collected are sequentially selected from the received client list of clients without collection (Step S1902). It is confirmed whether network connection to the selected client terminal 113 is possible (Step S1903). If possible (Yes at Step S1903), a result notice command containing the job ID is transmitted to the client terminal 113 (Step S1904). Thereafter, the distribution result notified from the client terminal 113 is received (Step S1906), and the result is transmitted to the distribution management server 101 (Step S1907).

It is judged whether the distribution results have been received from all client terminals 113 (Step S1908), and if not (No at Step S1908), the process returns to Step S1902. If reception of the distribution results of all client terminals 113 has been completed, the result collection command is deleted (Step S1909) to thereafter terminate the process. If network connection to the client terminal 113 cannot be established at Step S1903 (No at Step S1903), the status of acquisition failure is set as an acquisition failure flag (Step S1905) to thereafter advance to Step S1907.

If the received information is not the result collection command at Step S1901 (No at Step S1901), i.e., if the received information is the result notice command, the unnotified result list 123 is referred to in accordance with the job ID of the received result notice command as shown in FIG. 20 (Step S2001). It is judged whether the same job ID as the received job ID exists in the unnotified result list 123 (Step S2002). If exists (Yes at Step S2002), the install result set to the unnotified result list 123 is transmitted to the representative client terminal (Step S2003), and information on the job ID is deleted from the unnotified result list 123 (Step S2004), and also from the representative group list 122 (Step S2005) to thereafter terminate the process.

If the received job ID does not exist in the unnotified result list 123 (No at Step S2002), the result of the job is regarded as already notified, and result already notified information is transmitted to the representative client terminal (Step S2006).

According to the above-described embodiment, software distribution can be performed at high efficiency in the distribution completion time, through selection of representative client terminals and setting of representative client groups in accordance with software distribution actual performance information and present inventory information of each client terminal 113, and through distribution status monitoring and assignment changing by the distribution management server 101.

Further, by setting representative client groups, even if fault occurs at a particular representative client terminal when a distribution result is notified from the client terminal 113, the distribution result can be notified from another representative client terminal in the representative client group list 122, and since the distribution management server 101 sets newly a result collection representative client terminal in accordance with a result notice term, the distribution result can be acquired reliably.

Furthermore, by accumulating the software distribution actual performance information of each client terminal when selected as the representative client terminal, a high precision distribution management system can be realized.

(First Modification)

With reference to FIGS. 21 to 24, description will be made on the representative client selecting process to be executed by the representative client selecting module 104 of the distribution management server 101 according to a first modification of the embodiment. The representative client selecting module 104 acquires security information (recommended security information) recommended for an information system from each reference machine 130 and security information of each client terminal 113, and compares both the information to select as a representative client the client terminal 113 maintaining the status of the reference machine as its status of security policies. In this manner, it becomes possible to realize a distribution management system considering security inspection.

Figure 21:
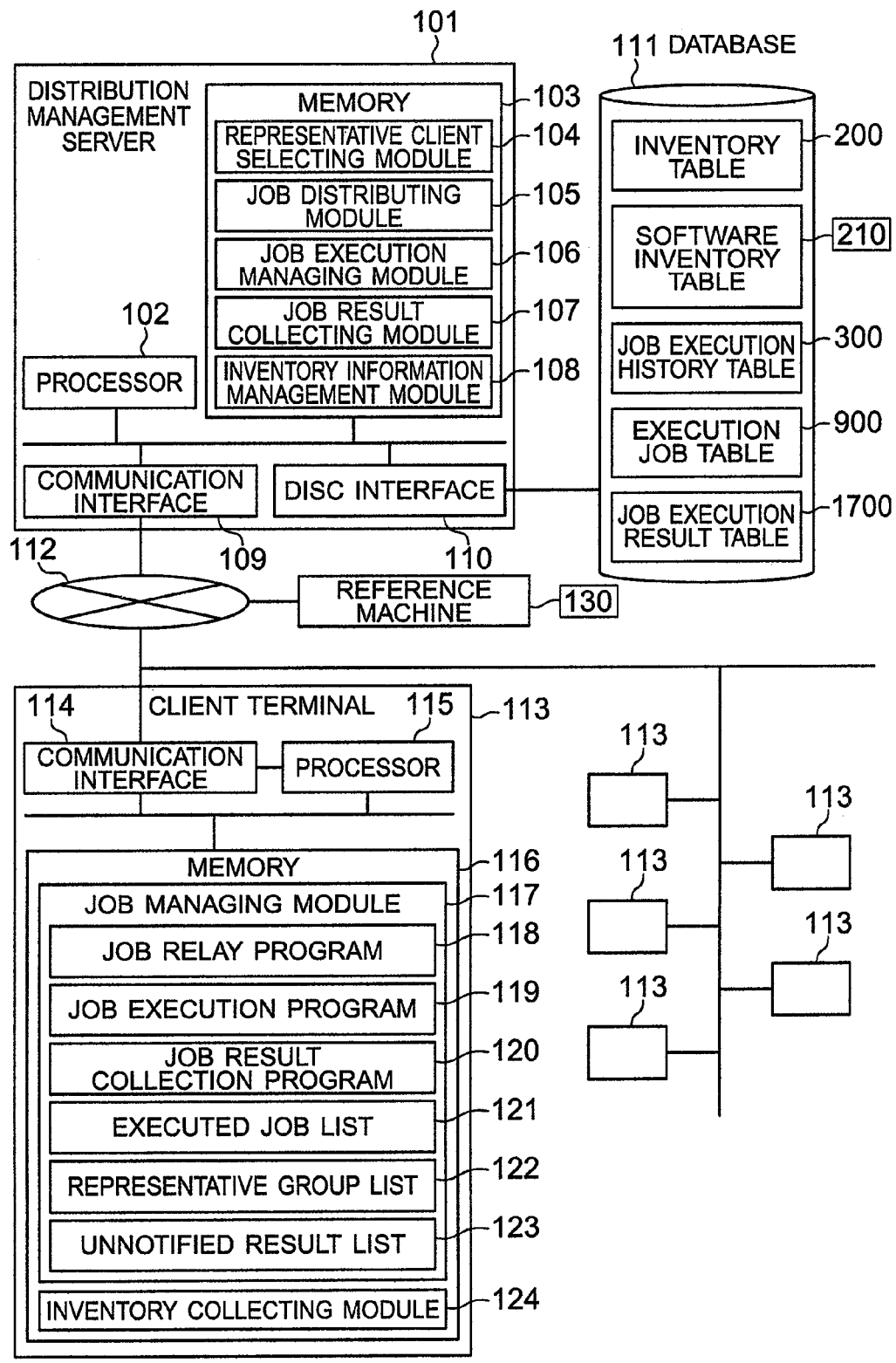
FIG. 21 is a diagram showing the configuration of a distribution management system according to a first modification.

FIG. 21 is a diagram showing the configuration of a distribution management system according to the first modification. As compared to FIG. 1, each reference machine 130 is connected to the network 112 as shown in FIG. 21. The database 111 of the distribution management server 101 stores a software inventory table 210 (refer to FIG. 22). An additional constituent element is made clear by surrounding its reference symbol with a rectangle. Constituent elements identical to those shown in FIG. 1 are represented by same numerals, and the description thereof is omitted.

FIG. 22 is a diagram showing an example of the software inventory table. The software inventory table 210 stored in the database 111 stores an arbitrary ID number 211, a host name 212 of each client terminal as a reference machine or a terminal to be managed, a batch/antivirus product name 213 installed in each host, and version information 214 of each batch/antivirus product name. The inventory information managing module 108 of the distribution management server 101 updates the software inventory table 210 in accordance with inventory information uploaded from the inventory collecting module 124 of each client terminal 113.

Figure 23:
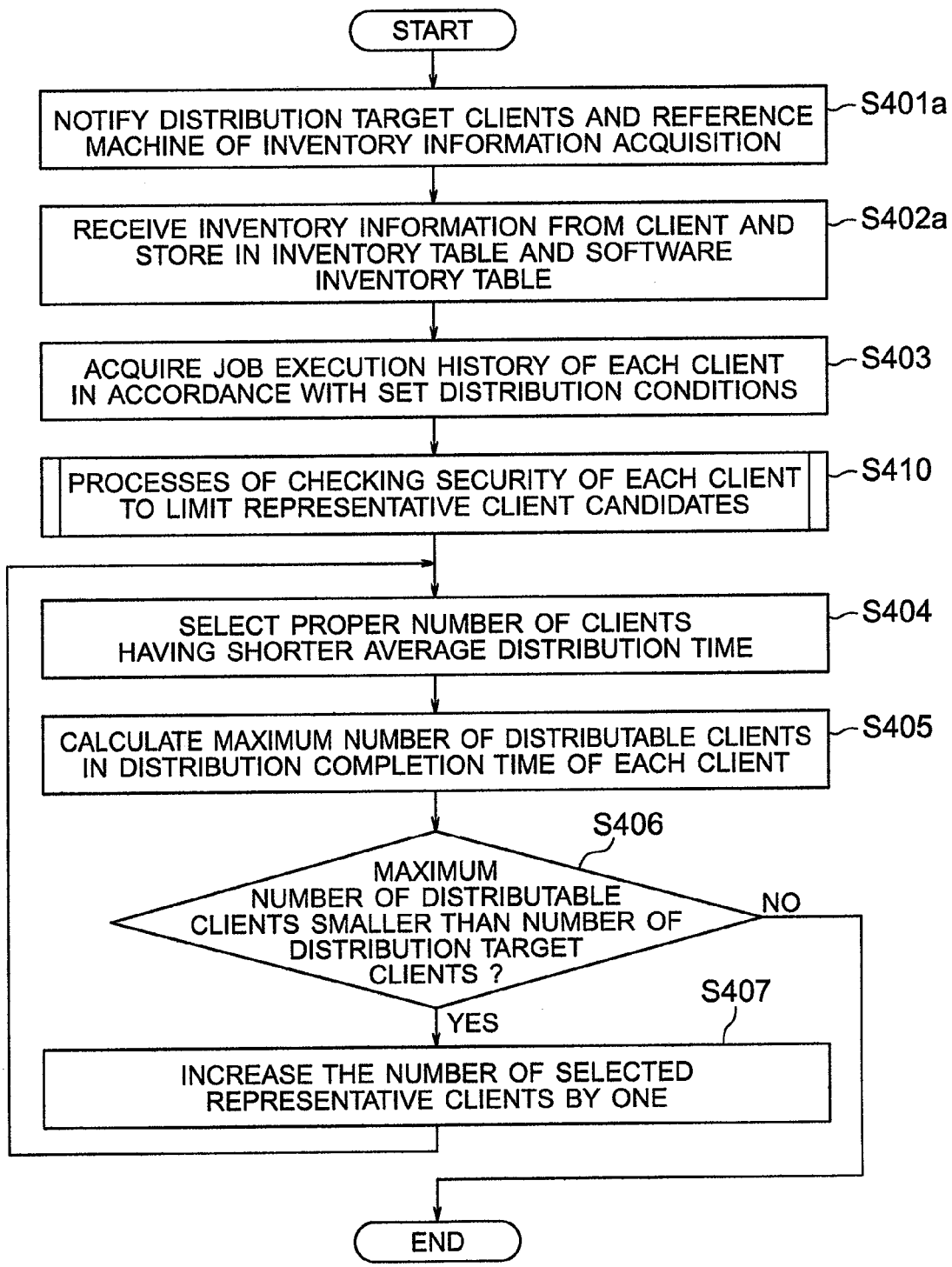
FIG. 23 is a flow chart illustrating processes to be executed by the representative client selecting module according to the first modification.

FIG. 23 is a flow chart illustrating processes to be executed by the representative client selecting module according to the first modification. The same processes as those shown in FIG. 4 are represented by identical symbols, the description thereof is omitted, and different processes will be described mainly. The representative client selecting module 104 of the distribution management server 101 transmits a collection/notice command also to the reference machine 130 in addition to the process at Step S401 shown in FIG. 4 (Step S401a), and stores inventory information received from each client terminal 113 and each reference machine 130 in the inventory table 200 and software inventory table 210 (Step 402a).

The reference machine 130 is a machine having similar functions to those of the client terminal 113, and the status of the machine is managed by the administrator so as to maintain a minimum security policy required for an information system. Therefore, a client terminal not installed with batch information and antivirus product information installed in the reference machine 130 is regarded as a machine having a low security policy.

Next, similar to FIG. 4, by using the selection conditions for the representative client terminals, host names 303 and average distribution times 304 satisfying the conditions are acquired from the job execution history table 300 (refer to FIG. 3) (Step S403). Security check is performed for each client terminal 113 to execute a process of limiting representative client candidates (refer to FIG. 24) (Step S410).

Figure 24:
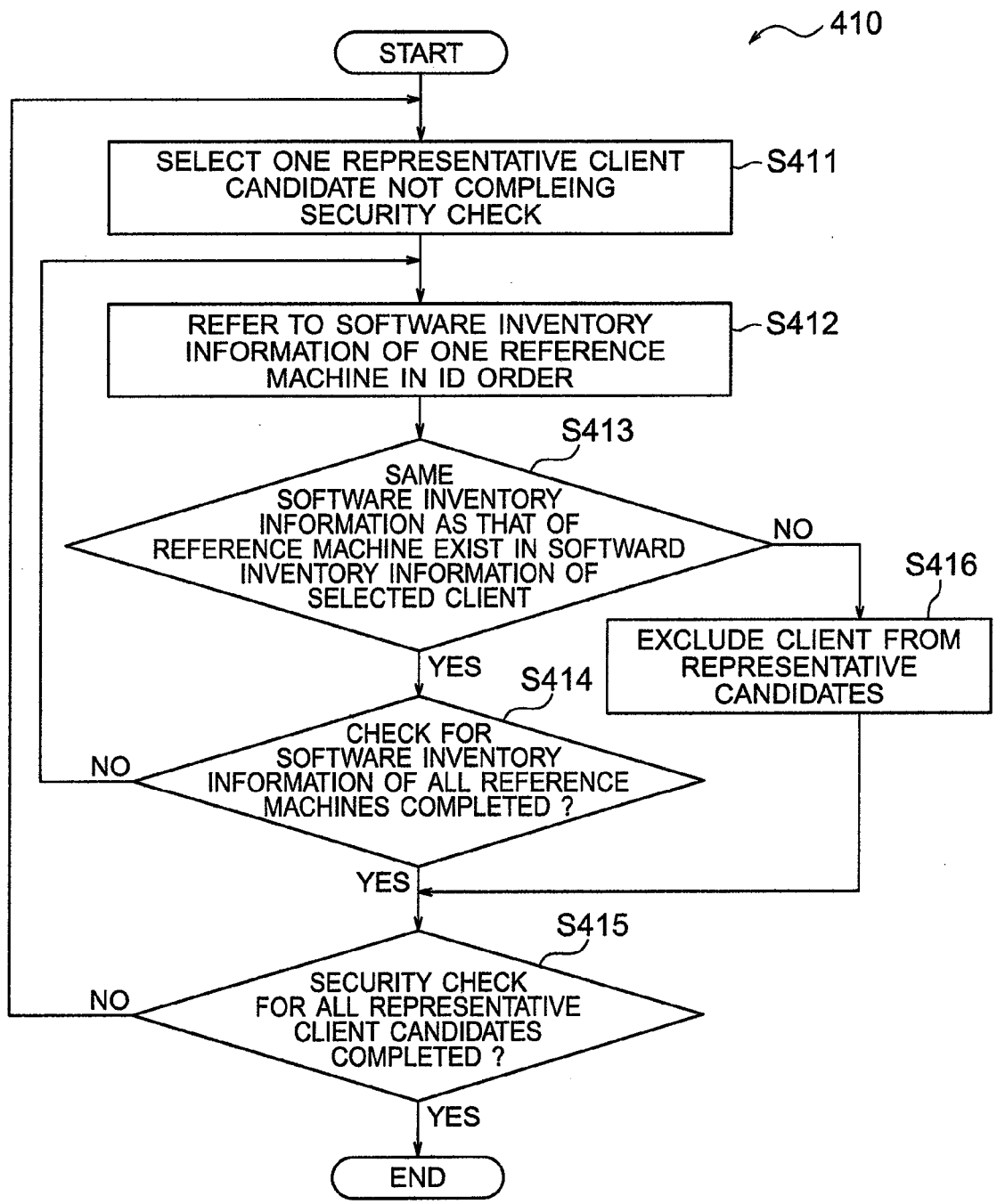
FIG. 24 is a flow chart illustrating a process of performing a security check of each client to limit candidates for representative clients.

FIG. 24 is a flow chart illustrating processes of performing security check for each client terminal to execute a process of limiting representative client candidates. The security policies of the representative client candidates limited by the selection conditions are compared with the security policy of each reference machine 130 to further limit the representative client candidates.

The representative client selecting module 104 selects one of the representative client candidates still not completing a security check (Step S411). Next, the software inventory information of one of the reference machines 130 is referred in the order of ID (Step S412). It is judged whether the same software inventory information as that of the reference machine 130 exists in the software inventory information of the selected client terminal 113 (Step S413). If exists (Yes at Step S413), it is judged whether the software inventory information of all reference machines 130 has been checked (Step S414), and if not checked (No at Step S414), the process returns to the process at Step S412. By referring to the next software inventory information, it is again checked whether the software inventory information is installed in the client terminal.

If the representative client candidate does not have software inventory information of the reference machine 130 (No at Step S413), the representative client candidate is judged as a client having a low security policy, and excluded from the representative client candidates (Step S416) to thereafter advance to Step S415.

If the software inventory information of all reference machines 130 has been checked completely at Step S414 (Yes at Step S414), it is judged whether the security check has been completed for all representative client candidates (Step S415). If the security check has not been completed for all representative client candidates (No at Step S415), the process returns to Step S411, whereas if completed (Yes at Step S415), a series of processes at Step S410 is completed.

Reverting to FIG. 23, if the security check is completed for all representative client candidates, the process advances to Step S404. After the security check process is executed for the representative client candidates in this manner, the processes at Step S404 and succeeding Steps are performed to select a number of representative clients.

According to the first modification, when software is distributed, the security policy of each client is checked. A security risk can therefore be presented beforehand. For example, if a client having a low security policy is selected as the representative client and the distributed software is infected by virus, the software infected by virus is distributed to each client. Further, selecting the representative clients incorporating the security check of the first modification may also be used when the results are collected.

(Second Modification)

Figure 25:
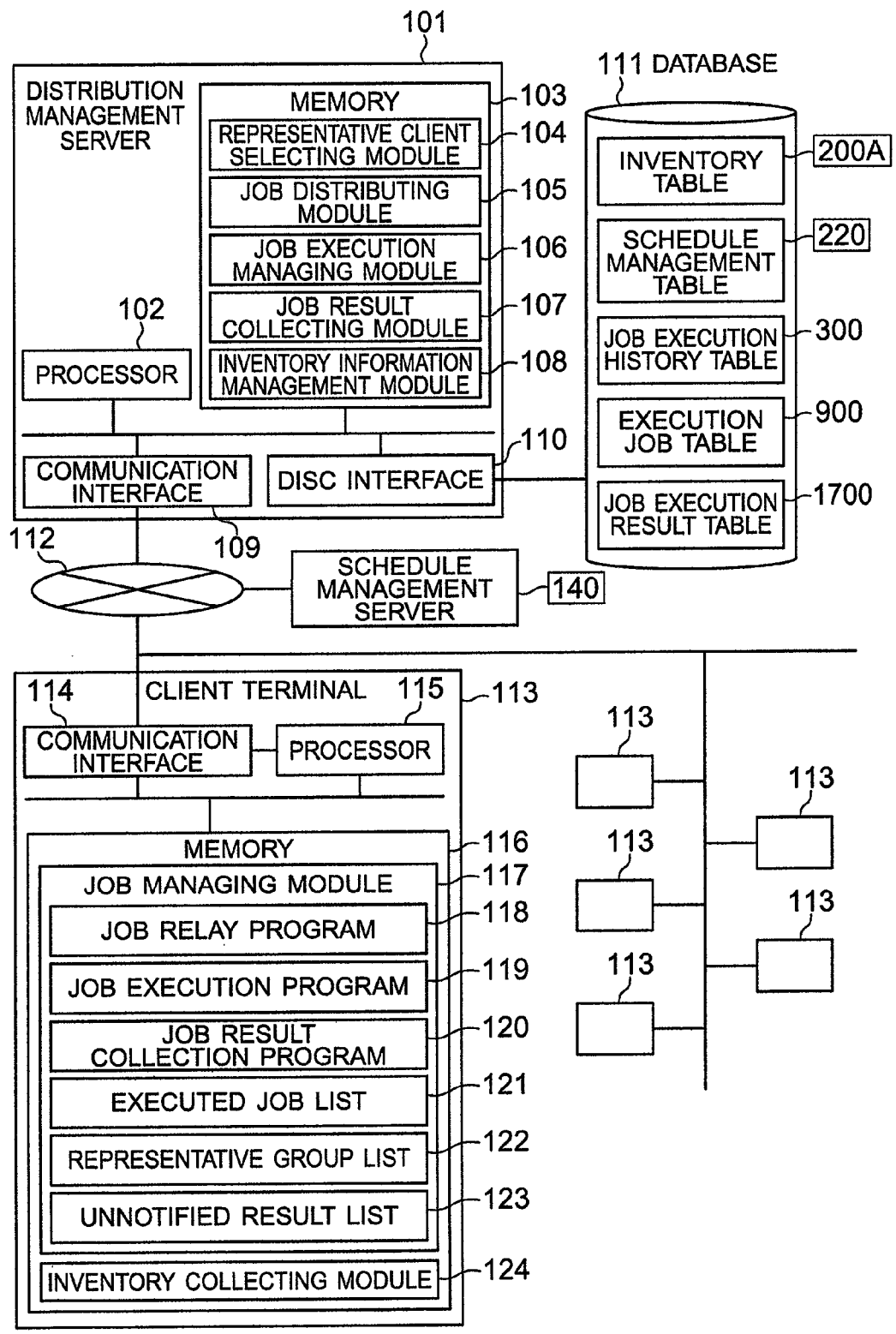
FIG. 25 is a diagram showing the configuration of a distribution management system according to a second modification.

With reference to FIGS. 25 to 27, description will be made on the representative client selecting process to be executed by the representative client selecting module 104 of the distribution management server 101 according to a second modification of the embodiment. The representative client selecting module 104 acquires the power status of each client terminal and schedule information of an end user using the machine (terminal), and the client terminal 113 not used is selected as the representative client. It is therefore possible to realize a distribution management system considering prevention of a lowered distribution efficiency of software by an end user using the representative client during the software distribution.

FIG. 25 is a diagram showing the configuration of a distribution management system according to the second modification. As compared to FIG. 1, a schedule management server 140 is connected to the network 112 as shown in FIG. 25. The database 111 of the distribution management server 101 stores a schedule management table 220 (refer to FIG. 26). An inventory table 200A (refer to FIG. 27) stores a power status 208 of the client terminal 113. An additional constituent element is made clear by surrounding its reference symbol with a rectangle. Constituent elements identical to those shown in FIG. 1 are represented by same numerals, and the description thereof is omitted.

FIG. 26 is a diagram showing an example of the schedule management table. The schedule management table 220 stored in the database 111 of the distribution management server 101 stores a host name 221 of each client terminal 113 and schedule information (routine of work, business trip, vacation leave) of an end user of each host, on each date (e.g., reference numerals 222 to 224). More specifically, it can be seen that client A is in a business trip on Jul. 24, 200X and Jul. 25, 200X and in routine of work on Jul. 26, 200X, and that client D is in routine of work on Jul. 24, 200X and in vacation leave on Jul. 25, 200X and Jul. 26, 200X.

The inventory information managing module 108 of the distribution management server 101 updates the schedule management table 220 in accordance with the schedule information uploaded from the schedule management server 140.

FIG. 27 is a diagram showing another example of the inventory table. The same items to those shown in FIG. 2 are represented by identical reference numerals, and the description thereof is omitted. The inventory table 200A includes a power status 208 of each client terminal 113 and a machine type 209 indicating whether the client terminal 113 is a desktop PC or a note PC. The machine type 209 will be further described in the third modification.

Figure 28:
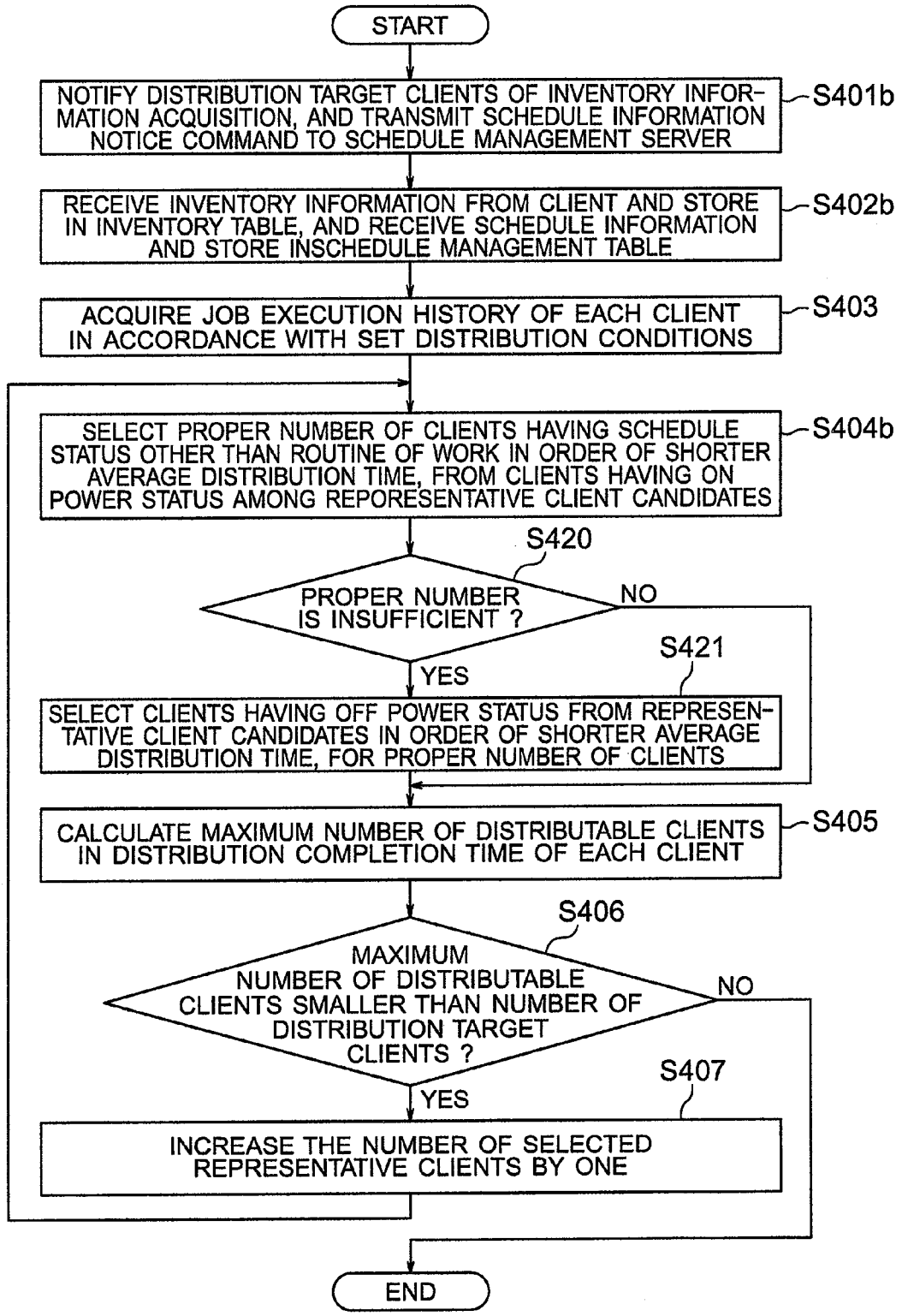
FIG. 28 is a flow chart illustrating processes to be executed by the representative client selecting module according to the second modification.

FIG. 28 is a flow chart illustrating processes to be executed by the representative client selecting module according to the second modification. The same processes as those of FIG. 4 are represented by identical symbols, and the description thereof is omitted. The inventory information managing module 108 of the distribution management server 101 acquires the power status of each client terminal 113 as inventory information from the client terminal 113, and stores the power status in the field of the power status 208 of the inventory table 200A (refer to FIG. 27). In addition to this process, in cooperation with the schedule management server 140, the representative client selecting module 104 transmits a notice command for schedule information of the end user of each client terminal to the schedule management server 140 (Step S401b), and stores the schedule information received from the schedule management server 140 in the schedule management table 220 (Step S402b). Thereafter, in accordance with the set selection conditions, host names 303 and average distribution times 304 satisfying the conditions are acquired from the job execution history table 300 (refer to FIG. 3) (Step S403) to select representative client candidates.

Next, for the clients having an ON power status in the inventory table 200A among the representative candidates, the schedule information of an end user of each client is acquired from the schedule management table 220. A number of clients having the status indicating that the end user does not use the terminal, e.g., having the status other than "routine of work" assuming that there are statuses of "routine of work", "business trip" and "vacation leave", are selected in the order of shorter average distribution time (Step S404b). It is judged whether a number of representative clients are selected, i.e., whether the number of representative clients is insufficient (Step S420). If the number of representative clients is sufficient (No at Step S420), the process advances to Step S405. If the number of representative clients is not selected (Yes at Step S420), the clients having an OFF power status are selected from the representative client candidates 113 in the order of shorter distribution time, as the representative client candidates for the number of representative clients to be selected for the distribution command (Step S421). Thereafter, in accordance with the selected representative client candidates, a maximum number of clients for which distribution can be performed in the job completion time is calculated similar to the case shown in FIG. 4 (Step S405).

If the client terminal 113 having the OFF power status is selected at Step S421, the power of the client terminal 113 having the OFF power status is turned on by a wake-on LAN (WOL) function. The WOL function is a function of turning on a power of a computer via LAN.

According to the second modification, by selecting a machine not in use as the representative client, it becomes possible to realize a distribution management system which can prevent a lower distribution efficiency of software in advance and is effective for distribution and result collection of batch/antivirus products having urgency in view of security, educational and learning software, or questionnaires.

(Third Modification)

With reference to FIGS. 1, 27, 29 and 30, description will be made on the representative client selecting process to be executed by the representative client selecting module 104 of the distribution management server 101 according to a third modification of the embodiment. The inventory information managing module 108 acquires the machine type indicating whether each client terminal 113 is a desktop PC or a note PC, as inventory information (refer to the machine type 209 in FIG. 27), and the representative client selecting module 104 operates not to select a note PC, which has the characteristics that it becomes freely portable (disconnectable from a network), when representative clients are selected.

In this manner, it becomes possible to realize a highly reliable distribution management system considering a risk of interception of the distribution process to be caused by disconnection from the network during execution of the distribution process. Furthermore, distribution is performed for the client terminal having the machine type of a note PC with a priority over the client terminal having the machine type of a desktop PC, because of the PC characteristics described above. This is because if install or version-up of, for example, batch/antivirus products or information security policy software, is performed preferentially for a note PC, a security policy can be realized quickly for a client terminal having a high information leakage risk.

Figure 29:
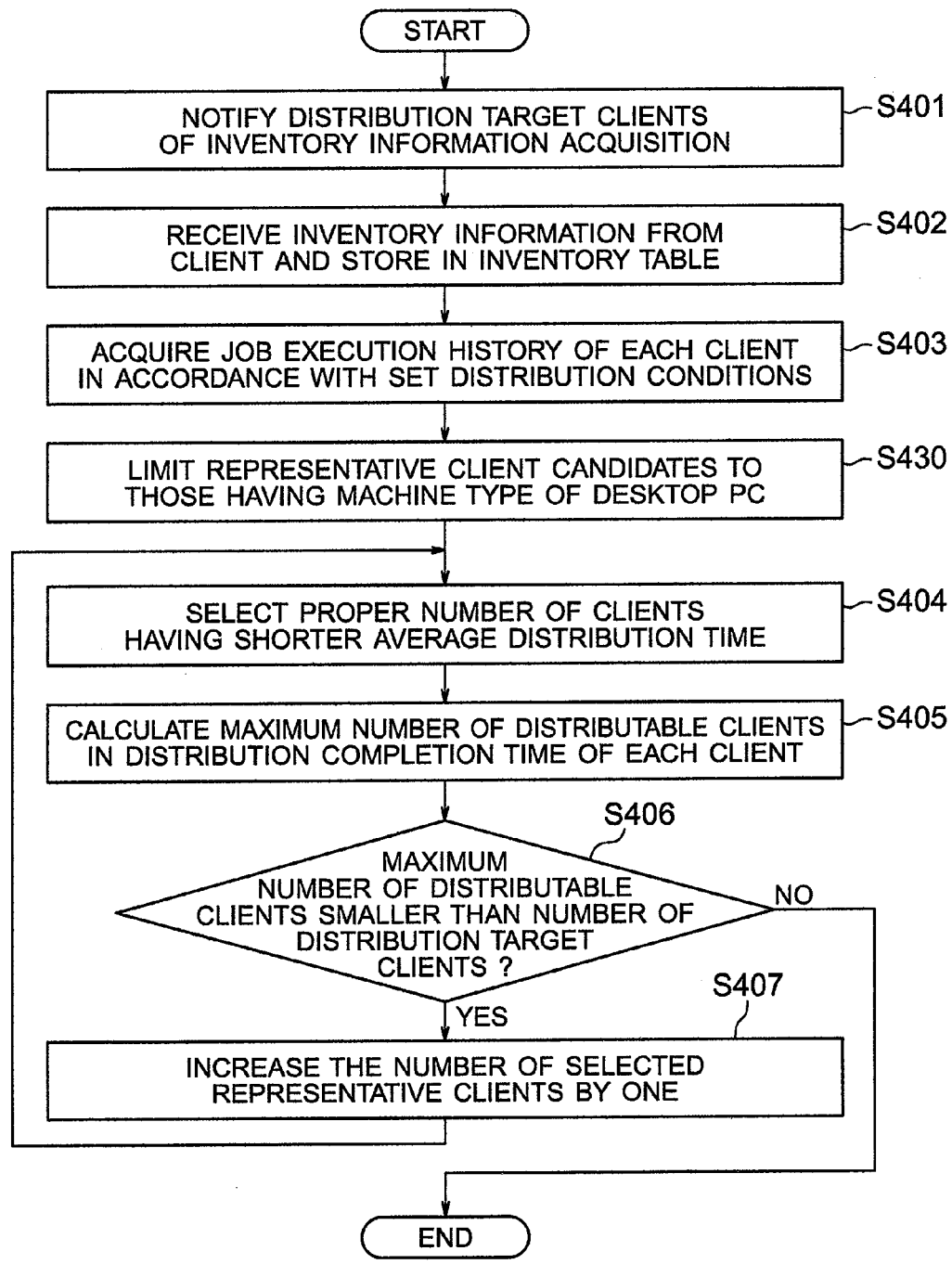
FIG. 29 is a flow chart illustrating processes to be executed by the representative client selecting module according to a third modification.

FIG. 29 is a flow chart illustrating processes to be executed by the representative client selecting module according to the third modification. The same processes as those shown in FIG. 4 are represented by identical reference symbols, and the description thereof is omitted. The representative client selecting module 104 of the distribution management server 101 acquires inventory information from each client and stores it in the database, and thereafter, selects representative client candidates in accordance with the set selection conditions. Next, the representative client candidates are limited to the clients having the machine type of a desktop PC in accordance with the information on the machine type 209 in the inventory table 200A (refer to FIG. 27) (Step S430). After the machine type judgment process is performed for the representative client candidates in this manner, the processes at Step S404 and succeeding Steps are executed to select a number of representative clients.

In the process at Step S1002 by the job relay program 118, when each representative client selects a client for which a job is distributed, in accordance with the distribution target client list 801A (refer to FIG. 30), the distribution process is executed in such a manner that a client having the machine type of a note PC in the distribution target client list is selected with a priority over a client having the machine type of a desktop PC.

FIG. 30 is a diagram showing another example of the distribution target client list. The distribution target client list 801A created when the job distributing module 105 (refer to FIG. 1) executes a job is a list setting a job ID uniquely determined and assigned for identifying a distribution command to be executed, a host name and an IP address of the client terminal 113 as a software distribution target, and a distribution priority representative client to which distribution is performed preferentially. As compared to FIG. 8, an item of the machine type is added in FIG. 30. More specifically, a client B having the machine type of a note PC is selected with a priority over a client D having the machine type of a desktop PC, and similarly, a client G having the machine type of a note PC is selected with a priority over a client E having the machine type of a desktop PC.

According to the third modification, by selecting a desktop PC client as the representative client, it becomes possible to alleviate a risk of interception of the distribution process, and by distributing software preferentially to a note PC, it becomes possible to alleviate a risk of secret information outflow to be caused by information leakage.

As described so far, as in the first to third modifications, security, promptness and reliability of a distribution management system can be improved by adding a process considering security status, power status and machine type of each client to the representative client selecting module 104 of the distribution management server 101.

According to the present invention, if software such as batch of an operating system (OS) and adoption of a virus definition file is desired to be distributed quickly to client terminals, the distribution status of representative clients can be altered depending upon circumstances at the time so that rapid security actions can be made for client terminals of an information processing system. Further, by reliably notifying the distribution result to the distribution management server, a system administrator can reliably monitor and confirm the running status of each client so that security and its actions for the whole information processing system can be improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A distribution management method of distributing software to a plurality of clients via representative clients of the plurality of clients, the representative clients being in charge of distribution relay of said software, selected by a management server, said method comprising:

gathering, by the management server inventory information from each of the plurality of clients and storing the inventory information to the memory of the management server;

selecting, by the management server, the representative clients from the plurality of clients based on selection conditions, the representative clients receiving the software from the management server and sending the software to target clients, which are clients from the plurality of clients other than the respective clients;

distributing, by the management server, the software to the target clients via the selected representative clients;

receiving, by the management server, a distribution result from each of the target clients via the selected representative clients, and storing the distribution result and a distribution time into the memory;

calculating, by the management server, an average distribution time for each of the plurality of clients by measuring the distribution time and the number of clients to which the software is to be distributed, and storing the average distribution time and the number of clients into the memory as distribution history information;

selecting, by the management server, at least two representative clients from the plurality of clients satisfying said selection conditions by referring to said inventory information and said distribution history information, said selection conditions including a condition that selects a client that satisfies where a CPU use factor registered in said inventory information is lower than a predetermined value of said CPU use factor and that satisfies where the average distribution time registered in said distribution history information is shorter than the average distribution time of other clients of the plurality of clients; and generating, by the management server, representative group information from the selected representative clients, and transmitting the representative group information to each of the target clients via each one of the selected representative clients, wherein each of the target clients performs steps of:
receiving the representative group information and software from one of the selected representative clients;
determining whether the target client is not the one of the selected representative clients, and determining whether the target client can connect to the same one of the selected representative clients which the target client receives the software from, in order to transmit the distribution result to the management server; and
if the target client cannot connect to the same one of the selected representative clients, connecting to another one of the selected representative clients in accordance with said representative group information.

2. A distribution management system comprising:
a plurality of clients; and
a management server for selecting representative clients of the plurality of clients to be in charge of distribution relay of software from said clients and distributing said software to said clients via said representative clients,
wherein said management server comprises a processor and an operatively coupled memory, and:
gathers inventory information from each of the plurality of clients and stores the inventory information to the memory of the management server;
selects the representative clients from the plurality of clients based on selection conditions, the representative clients receiving the software from the management server and sending the software to target clients, which are clients from the plurality of clients other than the respective clients;
distributes the software to the target clients via the selected representative clients;
receives a distribution result from each of the target clients via the selected representative clients, and stores the distribution result and a distribution time into the memory;
calculates an average distribution time for each of the plurality of clients by measuring the distribution time and the number of clients to which the software is to be distributed, and storing the average distribution time and the number of clients into the memory as distribution history information;
selects at least two representative clients from the plurality of clients satisfying said selection conditions by referring to said inventory information and said distribution history information, said selection conditions including a condition that selects a client that satisfies where a CPU use factor registered in said inventory information is lower than a predetermined value of said CPU use factor and that satisfies where the average distribution time registered in said distribution history information is shorter than the average distribution time of other clients of the plurality of clients; and
generates representative group information from the selected representative clients, and transmits the representative group information to each of the target clients via each one of the selected representative clients, wherein each of the target clients:
receives the representative group information and the software from one of the selected representative clients;
determines whether the target client is not the one of the selected representative clients, and determines whether the target client can connect to the same one of the selected representative clients which the target client receives the software from, in order to transmit the distribution result to the management server; and
if the target client cannot connect to the same one of the selected representative clients, connects to another one of the selected representative clients in accordance with said representative group information.

3. The distribution management method according to claim 1, further comprising:
wherein each of the target clients further performs a step of registering the distribution result in the memory of the target client if the target client cannot connect to any other representative clients to send the distribution result, and
wherein the method further comprises performing, by the management server, steps of:
determining if there are any clients that the management server does not receive the distribution result from;
determining if the management server cannot connect to all selected representative clients;
if there are any clients that the management server does not receive the distribution result from, and if the management server cannot connect to all selected representative clients, generating a client list including clients that the management server does not receive the distribution result from;
selecting other representative clients based on the selection conditions; and
distributing the client list to the selected other representative clients to receive the distribution result.

4. The distribution management system according to claim 2,
wherein each of the target clients further registers the distribution result in the memory of the target client if the target client cannot connect to any other representative clients to send the distribution result, and
wherein the management server further:
determines if there are any clients that the management server does not receive the distribution result from;
determines if the management server cannot connect to all selected representative clients;
if there are any clients that the management server does not receive the distribution result from, and if the management server cannot connect to all selected representative clients, generates a client list including clients that the management server does not receive the distribution result from;
selects other representative clients based on the selection conditions; and
distributes the client list to the selected other representative clients to receive the distribution result.

* * * * *